United States Patent
Prasad

(10) Patent No.: US 6,377,550 B1
(45) Date of Patent: Apr. 23, 2002

(54) NESTED MEASUREMENT PERIOD SWITCH ALGORITHM FOR FLOW CONTROL OF AVAILABLE BIT RATE ATM COMMUNICATIONS

(75) Inventor: Sharat Prasad, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/179,789

(22) Filed: Oct. 27, 1998

Related U.S. Application Data

(60) Provisional application No. 60/063,357, filed on Oct. 28, 1997.

(51) Int. Cl.[7] .................. G08C 15/00; H04L 12/24; H04L 12/26
(52) U.S. Cl. .............. 370/236.1; 370/229; 370/230; 370/231; 370/235; 370/236; 370/395; 370/464; 370/466; 370/468; 370/471; 370/232; 370/389; 370/395.1
(58) Field of Search ................... 370/229, 230, 370/231, 232, 233, 234, 235, 236, 237, 395, 464, 465, 466, 468, 471, 236.1, 389, 395.1, 396, 397, 398, 399

(56) References Cited

U.S. PATENT DOCUMENTS

| | | | | |
|---|---|---|---|---|
| 5,737,313 A | * | 4/1998 | Kolarov et al. ............. | 370/234 |
| 5,754,530 A | * | 5/1998 | Awdeh et al. ............... | 370/232 |
| 5,777,984 A | * | 7/1998 | Gun et al. ................... | 370/230 |
| 5,848,056 A | * | 12/1998 | Meurisse et al. ........... | 370/232 |
| 5,889,761 A | * | 3/1999 | Yamato ....................... | 370/231 |
| 5,909,443 A | * | 6/1999 | Fichou et al. ............... | 370/412 |
| 5,966,381 A | * | 10/1999 | Buckley et al. ............. | 370/395 |
| 5,991,268 A | * | 11/1999 | Awdeh et al. ............... | 370/232 |
| 6,014,367 A | * | 1/2000 | Joffe ........................... | 370/230 |
| 6,049,542 A | * | 4/2000 | Prasad ........................ | 370/386 |
| 6,052,361 A | * | 4/2000 | Ansari et al. ............... | 370/232 |
| 6,061,330 A | * | 5/2000 | Johansson ................... | 370/229 |
| 6,088,359 A | * | 7/2000 | Wicklund et al. .......... | 370/395 |
| 6,178,159 B1 | * | 1/2001 | He et al. ..................... | 370/234 |
| 6,192,033 B1 | * | 2/2001 | Benson et al. .............. | 370/236 |
| 6,192,406 B1 | * | 2/2001 | Ma et al. ..................... | 709/226 |
| 6,205,151 B1 | * | 3/2001 | Quay et al. .................. | 370/416 |
| 6,252,847 B1 | * | 6/2001 | Lee .............................. | 370/229 |
| 6,275,491 B1 | * | 8/2001 | Prasad et al. ............... | 370/389 |
| 6,324,165 B1 | * | 11/2001 | Fan et al. .................... | 370/232 |

* cited by examiner

Primary Examiner—Hassan Kizou
Assistant Examiner—Joe Logsden
(74) Attorney, Agent, or Firm—J. Dennis Moore; W. James Brady, III; Frederick J. Telecky, Jr.

(57) ABSTRACT

An Asynchronous Transfer Mode (ATM) switch (8) and method of operating the same to allocate Available Bit Rate (ABR) communications therethrough. The switch receives resource management (RM) cells over a sequence of measurement periods. A plurality of rate levels are defined, each associated with a measurement period of a corresponding duration; the measurement periods being nested. Saved and current values of the number of flows associated with each level, and saved and current values of the aggregate rates of these flows, are retained in memory. RM cells are received during the various measurement periods, and the various numbers and aggregate rates are maintained for each rate level, including the use of estimates for flows that have changed rate level. A bottleneck rate is determined as the larger of the ratio of ABR bandwidth to ABR flows, or the largest cell rate plus surplus bandwidth derived according to this sum. The bottleneck rate is then sent to the AT sources by backward-traveling RM cells, for adjustment of the ABR traffic.

16 Claims, 6 Drawing Sheets

NESTED MEASUREMENT PERIOD SWITCH ALGORITHM FOR FLOW CONTROL OF AVAILABLE BIT RATE ATM COMMUNICATIONS

CROSS-REFERENCE TO RELATED APPLICATIONS

This application claims the benefit, under 35 U.S.C. §119(e)(1), of U.S. Provisional Application No. 60/063,357, filed Oct. 28, 1997, which is incorporated herein by this reference.

STATEMENT REGARDING FEDERALLY SPONSORED RESEARCH OR DEVELOPMENT

Not applicable.

BACKGROUND OF THE INVENTION

This invention is in the field of telecommunications, and is more specifically directed to flow control in asynchronous transfer mode (ATM) communications.

In the field of digital communications, whether applied to voice, video, or data communication, various techniques have been developed for routing messages among nodes connected in a network. One such approach is referred to as packet-based data communications, in which certain network nodes operate as concentrators to receive portions of messages, referred to as packets, from the sending units. These packets may be stored at the concentrator, and are then routed to a destination concentrator to which the receiving unit indicated by the packet address is coupled. The size of the packet refers to the maximum upper limit of information that can be communicated between concentrators (i.e., between the store and forward nodes), and is typically a portion of a message or file. Each packet includes header information relating to the source network address and destination network address, which permits proper routing of the message packet. Packet switching with short length packets ensures that routing paths are not unduly dominated by long individual messages, and thus reduces transmission delay in the store-and-forward nodes. Packet-based data communications technology has enabled communications to be carried out at high date rates, up to and exceeding hundreds of megabits per second.

A well-known example of a fast packet switching protocol, which combines the efficiency of packet switching with the predictability of circuit switching, is Asynchronous Transfer Mode (generally referred to as "ATM"), in which packet lengths and organization are fixed, regardless of message length or data type (i.e., voice, data, or video). The fixed packets according to the ATM protocol are referred to as "cells", and each ATM cell is composed of fifty-three bytes, five of which are dedicated to the header and the remaining forty-eight of which serve as the payload. According to this protocol, larger packets are made up of a number of fixed-length ATM cells. The fixed-size cell format enables ATM cell switching to be implemented in hardware, as opposed to software, resulting in transmission speeds in the gigabits-per-second range. In addition, the switching of cells rather than packets permits scalable user access to the network, from a few Mbps to several Gbps, as appropriate to the application. The asynchronous nature of the transmission permits ATM cells to be used in transmitting delay-tolerant data traffic intermixed with time-sensitive traffic like voice and video over the same backbone facility. To more efficiently utilize the bandwidth for these various applications, traffic management techniques are now employed which give priority to time-sensitive traffic relative to delay-tolerant traffic.

Closed loop traffic management involves the use of feedback signals between two network nodes to govern the data rates of channels, with a goal of improving the efficiency of bandwidth utilization. This efficiency improvement is particularly necessary when communication of compressed voice and video information is involved, because compression tends to make the bit rate variable, in which case the feedback signals enable the network to communicate either the availability of bandwidth or the presence of congestion.

Current traffic management schemes utilize various transmission categories to assign bandwidth in ATM communications. One high priority category is Constant Bit Rate (CBR), in which the transmission is carried out at a constant rate. Two categories of Variable Bit Rate (VBR) transmission are also provided, one for real-time information and another for non-real-time information. A low priority category is Unspecified Bit Rate (UBR), in which data are transmitted by the source with no guarantee of transmission speed. In the recently-developed Available Bit Rate (ABR) service class, feedback from the network nodes, via Resource Management (RM) cells or by way of explicit congestion indications in data cells, is used by the source network node to dynamically control channel transmission rate in response to current network conditions, and within certain transmission parameters that are specified upon opening of the transmission channel (i.e., in the traffic "contract").

For the ABR class of service, the source and destination nodes agree, in the traffic contract, upon a Peak Cell Rate (PCR) and a Minimum Cell Rate (MCR), thus setting the upper and lower bounds of transmission for an ABR communication. Once these bounds are established, a flow control algorithm is executed, typically both at the source network node and at ATM switches in the network, to define the current transmission rate of each channel. As is known in the art, thousands of connections may be simultaneously open between a given pair of network nodes. As such, traffic management can be a relatively complex operation, especially in controlling ABR category communications.

The setting of upper and lower bounds for ABR traffic is only one issue in ATM flow control. Another issue addressed by ATM flow control schemes, referred to in the art as "fairness", is the allocation of available bandwidth among the multiple ABR channels that are to be carried by a given link, especially in the case where the available bandwidth is less than the PCR of each of the channels. A proper fairness scheme requires that ABR channels with the highest PCR (or MCR) do not dominate the available bandwidth, and also that the channels with the lowest PCR (or MCR) are not disproportionately served relative to the high data rate channels.

Several fairness criteria are known in the field of ATM flow control. One fairness criterion, referred to as the "Max-Min" scheme, is popular as it leads to the maximization of total throughput. This approach is based upon an iterative procedure of computing the cell rate allocation among ABR channels. In a first iteration (l=1) of the procedure, a set variable $u_1$ defines the set of links making up the network, and a set variable $v_1$ defines the set of ABR flows traversing the network. Variable $b_j$ is initialized to the bandwidth available to a link $L_j$ in the network, and variable $n_j$ is initialized to the number of ABR flows sharing link $L_j$. During each iteration l, a ratio $r_l$ is determined as the smallest ratio $b_j/n_j$ for all links $L_j \in u_l$. A set of links $W_l=\{L_j\}\subseteq u_l$ is then defined as those links for which the ratio $b_j/n_j$ equals $r_l$, as is a set of flows $S_l=\{F_i\}\subseteq v_l$ where each flow $F_i$ in the set $S_l$ travels over one of the links in $W_l$. The set $W_l$ establishes the level l bottleneck links, and the set $S_l$ establishes the level l bottleneck flows. The data rate $r_l$ is the bottleneck rate of the links in set $W_l$ and is the constraint rate of the flows in set $S_l$. A reduced network $U_{l+1}$ is then constructed by subtracting the bottleneck set $W_l$ from the set $U_l$ set $v_{l+1}$ is then derived, by subtracting set $S_l$ from $v_l$, and defines the set of flows for which constraint rates remain to be determined. Considering m as the number of flows that are both in $S_l$ and which also travel over any link $L_j \subseteq U_{l+1}$, the construction of the reduced network is completed by subtracting the value $mr_l$ from $b_j$, and the number m from $n_j$ for each link $L_j \in U_{l+1}$. If the set $u_{l+1}$ is null, the bottleneck rate of each link and the constraint rate of each flow has been found.

While this approach readily defines the bottleneck and constraint rates, this procedure cannot be directly implemented into ATM network switches because global knowledge of the entire network is required; rather, a practical ATM switch algorithm must permit the links in the network to determine their bottleneck rates in a distributed fashion. A know distributed approach for an individual link $L_j$ of ABR bandwidth $R_j$, shared by $N_j$ ABR flows, begins by dividing the flows $N_j$ into two subsets: subset $C_j$ containing those flows constrained by another link $L_{x \neq j}$ in the network, and subset $B_j$ of the flows for which link $L_j$ is the bottleneck link. Link $L_j$ is, of course, a bottleneck link at some level k, such that subset $C_j$ contains flows that are constrained at links of bottleneck level 1 through K-1 inclusive. Considering each flow $F_i$ in this subset $C_j$ as having a constraint rate $r_i$, link $L_j$ can then determine the set $C_j$ and the constraint rates $r_i$ of its members $F_i$, and derive its own bottleneck rate $BR_j$ as follows:

$$BR_j = \frac{R_j - \sum_{i \in C_j} r_i}{|B_j|} \qquad (1)$$

According to this arrangement, each link $L_j$ assigns each of the flows in its subset $C_j$ the constraint rates assigned by the other constraining links in the network, and then equally divides the remaining bandwidth among the flows in its subset $B_j$, effectively assigning the bottleneck rate $BR_j$ thereto.

This approach is distributed, in the sense that each link can derive its own bottleneck rate. However, the time complexity of this algorithm is on the order of the square of the number of flows (i.e., $O(N^2)$) which, for large networks, can be quite substantial; the scaling of the network to accommodate more flows is rendered quite costly, given this dependence. Additionally, the memory needs for this approach are also quite substantial, as the ATM switches must maintain the constraint rate for each flow. As such, conventional approaches for simplifying the algorithm both in computational complexity and memory efficiency have been derived.

Charny, et al., "Time Scale Analysis and Scalability Issues for Explicit Rate Allocation in ATM Networks", *IEEE/ACM Trans. on Networking* (August 1996), pp. 569–581 describes one such simplified distributed algorithm primarily for determining the subset $C_j$ of flows that are constrained elsewhere from link $L_j$, by noting that any flow with a constraint rate $r_l$ less than the bottleneck rate $BR_j$ of link $L_j$ is clearly constrained at a link other than $L_j$. This approach may be understood by considering a hypothetical sequence of k constraint rates $r_l$, each occurring once in the sequence and arranged in descending order, and each having a tag $m_l$ identifying the number of flows having constraint rate $r_l$. One may consider the inequality:

$$r_{l^*-1} \geq \frac{R - \sum_{l=l^*}^{k} m_l r_l}{N - \sum_{l=l^*}^{k} m_l} > r_{l^*} \qquad (2)$$

where N is the total number of ABR flows (i.e., the sum of $m_l$ from l=1 to k) and where R is the total ABR bandwidth. The middle term of inequality (2) thus corresponds to the ratio of the remaining bandwidth of the link (total bandwidth R less the bandwidth occupied by flows constrained elsewhere; i.e., less the flows with lower constraint rates $r_l$, or higher index values as the sequence is arranged in descending order), to the number of remaining ABR flows (total number of flows less the number of flows having higher index constraint rates). According to this simplified distributed approach, inequality (2) is evaluated iteratively in order to find rate $r_l^*$, which is the smallest $r_l$ for which inequality (2) is satisfied. If inequality (2) is satisfied for some $l=l^* \geq 2$, then the link is oversubscribed, and the oversubscribed bottleneck rate $BR_o$ is given by:

$$BR_O = \frac{R - \sum_{l=l^*}^{k} m_l r_l}{N - \sum_{l=l^*}^{k} m_l} \qquad (3)$$

On the other hand, if inequality (2) is not satisfied even for $l^*=2$, the link is under-subscribed, in that sufficient ABR bandwidth is available in the link for all ABR flows. This under-subscribed condition may be represented by:

$$r_1 < \frac{R - \sum_{l=2}^{k} m_l r_l}{N - \sum_{l=2}^{k} m_l} = \frac{R - \sum_{l=2}^{k} m_l r_l}{m_1} \Rightarrow \sum_{l=1}^{k} m_l r_l < R \qquad (4)$$

In this case, maximization of data rate requires each of the flows passing through this link to be allowed to increase their data rate. According to the conventional distributed algorithm approach, a value for the bottleneck rate BR must be determined that allows the flows to cumulatively increase their rates by amounts that add up to precisely the difference $$R - \sum_{l=1}^{k} m_l r_l,$$

which is the amount of under-subscription. As described in the above-cited Charny et al. article, l" is the index such that all flows having a rate $r_{l<rl}$ are constrained at another link in the network; only flows that have rates $r_{l>rl}$ may thus increase their rates. The bottleneck rate $BR_U$ for the under-subscribed case is thus determined from equating the amount of under-subscription to the net proposed increase in data rate:

$$R - \sum_{l=1}^{k} m_l r_l = \sum_{l=1}^{l'-1} (BR_U - r_l) m_l = BR_U \sum_{l=1}^{l'-1} m_l - \sum_{l=1}^{l'-1} m_l r_l \quad (5)$$

which, in solving for the under-subscribed bottleneck rate $BR_U$, returns:

$$BR_U = \frac{R - \sum_{l=1}^{k} m_l r_l + \sum_{l=1}^{l'-1} m_l r_l}{\sum_{l=1}^{l'-1} m_l} = \frac{R - \sum_{l=l'}^{k} m_l r_l}{N - \sum_{l=l'}^{k} m_l} \quad (6)$$

Analysis of expression (6) indicates that smaller values of l' provide larger values of under-subscribed bottleneck rate $BR_U$; in the trivial case, where l'=1, $BR_U$= ∞. In closed-loop ATM flow control and traffic management, the under-subscribed bottleneck rate $BR_U$ corresponds to the explicit rate (ER) feedback sent to each source, to serve as an upper bound on the Allowed Cell Rate (ACR) for these channels in the absence of the true constraint rate. Accordingly, this conventional distributed algorithm selects the largest admissible value for $BR_U$, which is given by equation (6) for the case of l'=2:

$$BR_U = r_1 + \frac{R - \sum_{l=1}^{k} m_l r_l}{m_1} \quad (7)$$

This procedure, according to the conventional distributed algorithm, is useful in ATM flow control implemented according to the Max-Min fair rate allocation type of traffic management. However, it has been observed, in connection with the present invention, that each ATM switch must maintain a full sequence of flow rates, covering all flows communicated through each link. This requirement, of course, requires a large amount of high-speed memory, and involves computational complexity (i.e., processing time) of on the order of N, the total number of flows (i.e., O(N)). Computation of the bottleneck rate of a link itself also requires processing time of O(N), in the worst-case, considering that elements in the sequence of flow rates carried by a link are examined sequentially to determine when inequality (2) is satisfied.

By way of further background, another class of fairness algorithms relies upon approximations to reduce computation time and memory requirements relative to the Min-Max approach, such as described according to the foregoing example. However, these approximating approaches have been observed, in some network configurations, to converge to unfair rate allocations. Other algorithms are known that employ encoded representations of the flow rates, to reduce memory requirements, but these encoded approaches are of course subject to errors resulting from coding inaccuracy.

Another conventional flow control criterion is referred to in the art as "MCR-plus-fair-share" allocation. According to this approach, each ABR flow has a Minimum Cell Rate (MCR) assigned thereto in the traffic contract. Flow control in the network thus ensures that each ABR flow receives its MCR cell rate at a minimum, and assigns any remaining ABR bandwidth, beyond the sum of the MCRs, according to some sort of fair share allocation. This approach is similar to the Max-Min approach in the generation of the fair share allocation, except that the bandwidth being allocated corresponds only to the excess bandwidth over the MCRs, as opposed to the entire ABR bandwidth used in Max-Min allocation.

Common to all conventional ABR flow control schemes is the problem of congestion as CBR and VBR connections, as well as additional ABR connections, are added to the network, especially after a period of low bandwidth usage. If the network does not reduce the flow rates of the ABR rates quickly enough, congestion resulting in cell loss can occur. Conversely, low link utilization can result if an upstream ATM switch in the network does not promptly "invite" ABR sources to increase flow rates as bandwidth becomes available. In addition, all switch algorithms should be capable of handling growth in switch queues during transient events. Conventional techniques in this regard include requiring source stations to delay rate increases but immediately effect rate decreases, and setting-aside link bandwidth to handle transients; each of these techniques necessarily reduce link utilization, however.

Furthermore, all approaches that periodically recompute flow rate allocations are subject to problems of improper selection of the recomputation period, similarly as any closed loop feedback control scheme. On one hand, flow control becomes less responsive as the recomputation period lengthens; on the other hand, short recomputation periods can lead to measurement errors and unstable control. Some conventional flow control approaches select a long measurement interval and accept the reduced responsiveness, while other approaches use a shorter measurement interval in combination with exponential averaging or other filtering approaches to control the resulting errors.

BRIEF SUMMARY OF THE INVENTION

It is therefore an object of the present invention to provide an ATM switch, and a method of performing flow control at the same, that implements fairness in ABR rate allocation in a computationally efficient manner.

It is a further object of the present invention to provide such a switch and method with reduced memory requirements.

It is a further object of the present invention to provide such a switch and method that provides varying lengths of measurement periods for flows of differing cell rates, so that responsiveness and stability may both be optimized.

It is a further object of the present invention to provide such a switch and method for which scaling of the number of links, including ABR links, may be readily implemented.

Other objects and advantages of the present invention will be apparent to those of ordinary skill in the art having reference to the following specification together with its drawings.

The present invention may be implemented in an ATM switch and method of operating the same, to determine the bottleneck rate of each link handled by the switch as the maximum of two arguments: one argument is simply the ratio of the overall ABR bandwidth of the link divided by the number of ABR flows to be communicated by the link, while the other argument corresponds to the highest ABR flow rate plus (or minus) the surplus (or undersupply) bandwidth divided equally among the flows with the highest ABR rate. This determination is made at the end of each measurement period, where multiple measurement periods are defined, such that shorter measurement periods, associated with higher cell rate flows, are "nested" within longer periods. The current cell rate for each flow, as indicated in a received resource management (RM) cell is used to associate the flow with a cell rate level and thus one of the measurement periods. The determination of the highest ABR flow rate plus (or minus) the surplus (or undersupply) bandwidth divided equally among the flows with the highest ABR rates is then determined from a sum of the actual cell rates of flows having a cell rate level faster than or equal to that associated with the expired measurement period, with the sum of saved cell rates obtained in a previous measurement period, for those flows associated with unexpired measurement periods.

DETAILED DESCRIPTION OF THE INVENTION

As will become apparent from the following description, the present invention is particularly suited for efficiently and fairly allocating available bandwidth, in a communications network, among channels having the Available Bit Rate (ABR) service according to the Asynchronous Transfer Mode (ATM) communications protocol. As such, the following description will be primarily directed to an example of an ATM communication network arranged and operating according to the present invention. It is contemplated, however, that other communications protocols may equivalently benefit from the present invention, as will be apparent to those of ordinary skill in the art having reference to this specification.

Figure 1:
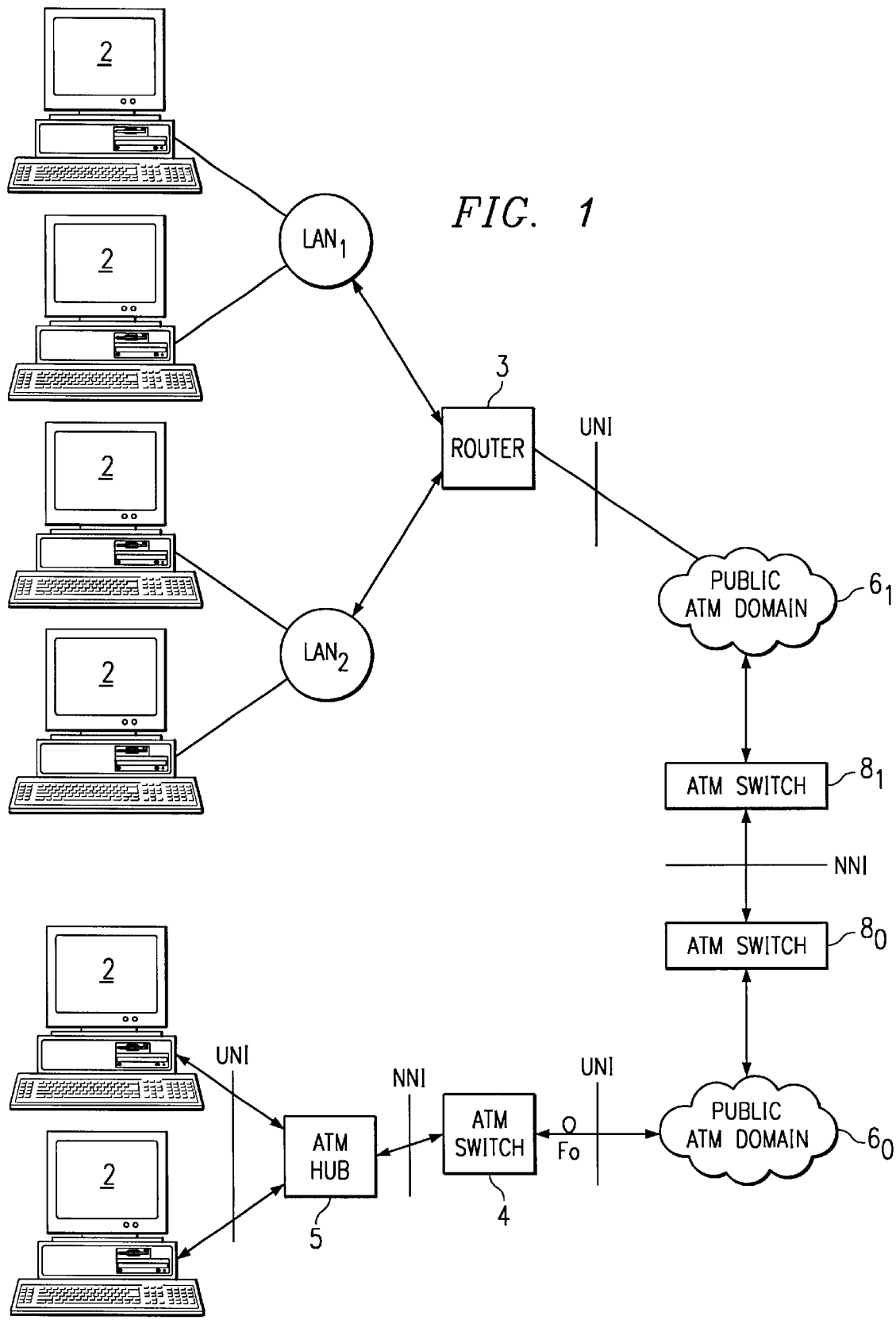
FIG. 1 is an electrical diagram, in block form, of a communications system incorporating the preferred embodiment of the present invention.

FIG. 1 illustrates an example of a large data communications network within which one of the preferred embodiments of the invention is implemented, operating according to the well-known Asynchronous Transfer Mode (ATM) protocol. In this example, various user workstations 2 are deployed in the network, at locations that not only vary in a logical fashion (i.e., are deployed at various logical locations, or addresses, in the network) but which may also be deployed at widely varying, worldwide, physical locations. These exemplary workstations 2 illustrate that ATM communications ultimately occurs between individual human users, and may include computer readable data, video bitstreams, and data for audio playback.

ATM hub 5 is interfaced with two workstations 2 in the example of FIG. 1. Workstations 2 in this example are arranged in a "pure" ATM network (in which desktop workstations include ATM adapters), an emulated LAN (in which the ATM network supports an existing LAN), or a LAN of the Ethernet type, such that each workstation 2 is in communication with ATM hub 5; of course, workstations 2 may alternatively be arranged in a token-ring LAN or other LAN type. An example of a conventional pure ATM network is described in *Introduction to SONET ATM* (Texas Instruments Inc., 1996), and an example of an emulated LAN is described in *LAN Emulation Over ATM Specifications, Version* 1.0 (The ATM Forum, January 1995). ATM hub 5 includes the necessary functionality for recognizing those communications from one of workstations 2 that are intended to be communicated over the network of FIG. 1 to a remote destination, and for forwarding these communications to ATM switch 4. In an ATM-to-desktop arrangement, the interface between workstations 2 and ATM hub 5 is of the User-to-Network Interface (UNI) type, and the interface between ATM hub 5 and ATM switch 4 is of the Network-to-Node Interface (NNI) type. In an Ethernet/ATM hub, the interface between workstation 2 and ATM hub 5 is Ethernet and the interface between ATM hub 5 and ATM switch 4 is of UNI type.

ATM switch 4 is a conventional switching device, for communicating ATM protocol communications between ATM hub 5 and the public ATM network, indicated by public ATM domain $6_0$. ATM switch 4 includes circuitry for performing those traffic management tasks required by the appropriate ATM specifications, such as *Traffic Management Specification, Version* 4.0 (The ATM Forum, April 1996). Additionally, ATM switch 4 includes such formatting circuitry as useful for applying signals to and receiving signals from the particular facility over which communications with public ATM domain $6_0$ is to take place; in this example, fiber optic facility Fo connects ATM switch 4 to public ATM domain $6_0$. In this regard, operations such as policing and, if required by public ATM domain $6_0$, traffic shaping, may be performed by ATM switch 4.

As is known in the art, the public ATM communications network includes various "domains" 6, such as those that may be maintained by various Internet backbone providers and the like. For example, public ATM domains $6_0$, $6_1$ in the network of FIG. 1 may be maintained by different long distance providers, each of which may set requirements upon the traffic that is being transmitted to it not only from its own interfaces, but also from other domains 6. As such, in the example of FIG. 1, switches $8_0$, $8_1$ are provided between public ATM domains $6_0$, $6_1$, such that an NNI-type interface is present thereat. Traffic management functions are generally required, if not merely desired, to be performed by ATM switches $8_0$, $8_1$, particularly in effecting the Available Bit Rate (ABR) class of service.

In the example of FIG. 1, router 3 is illustrated as interfacing with public ATM domain $6_1$ by way of a UNI-type interface. As is known in the art, routers such as router 3 interface multiple local-area networks (LANs). In this case, router 3 interfaces local-area networks $LAN_1$, $LAN_2$ with one another, each of which have multiple workstations 2 thereupon. In this example, local-area networks $LAN_1$, $LAN_2$ are of the token-ring type, but of course may alternatively be of an Ethernet type. Router 3 thus serves to effect communication among workstations 2 on local-area networks $LAN_1$, $LAN_2$ with one another, and to effect communication between workstations 2 on local-area networks $LAN_1$, $LAN_2$ and public ATM domain $6_1$ (and beyond).

Of course, while FIG. 1 illustrates public ATM domain $6_0$ as coupled to ATM switch 4 and ATM hub 5, and public ATM domain $6_1$ as coupled to local-area networks $LAN_1$, $LAN_2$ via router 3, each of public ATM domains $6_0$, $6_1$ will be in communication with many various facilities, including routers, ATM switches, ATM hubs, and the like. The arrangement of FIG. 1 is provided herein simply by way of example.

As noted above, flow control is carried out within the network of FIG. 1 in order to implement the ABR class of service. Fundamentally, ABR service is effected by the ABR traffic sources adjusting their data rates to current and changing network conditions. Information about the current state of the network, including bandwidth availability, network congestion, and the like, is communicated from network elements in the network, particularly by switches 8, to the ABR sources by way of resource management (RM) cells in the ATM packets. Current ATM specifications regarding ABR traffic management and flow control as set forth in *Traffic Management Specification, Version* 4.0 (The ATM Forum, April 1996), particularly in sections 2.4 and 5.10. As stated therein, switches 8 in a network over which ABR traffic is supported must perform certain functions, including control of congestion (by rate marking, EFCI marking, etc.), generation of backward RM-cells to produce feedback to the source, and control of rate levels of each of the flow passing through the particular switch 8.

Figure 2:
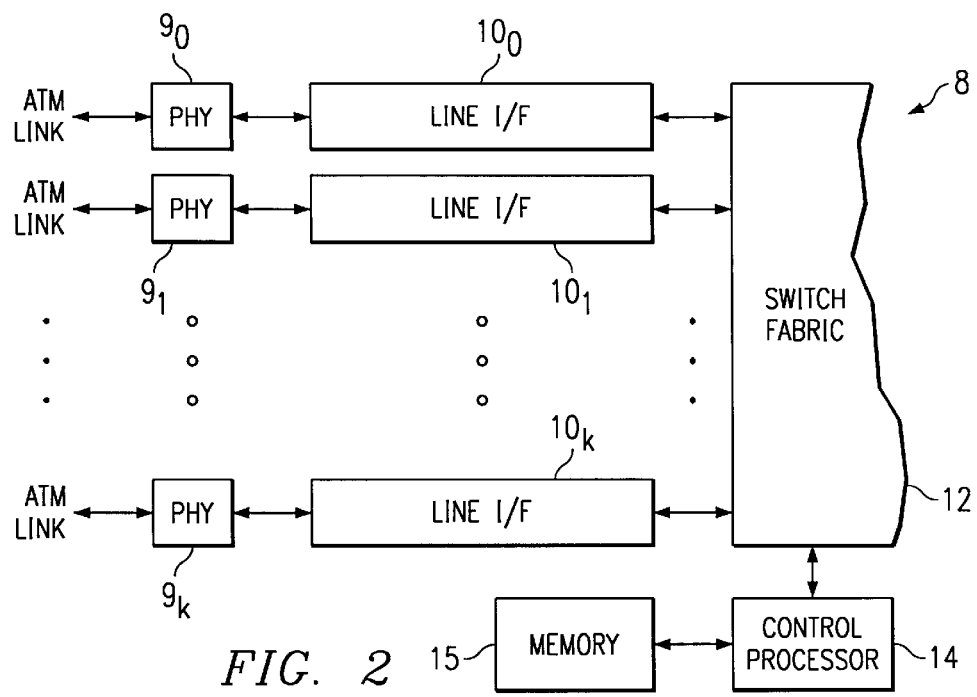
FIG. 2 is an electrical diagram, in block form, of an ATM switch incorporating the preferred embodiment of the present invention.

FIG. 2 illustrates, in block diagram form, an example of one of ATM switches 8 into which the preferred embodiments of the invention may be implements. As is well-known in the art, many different architectures are available for use in connection with the ATM switching function, in combination with performing traffic management, flow control, and other control functions as desired to maintain a high-performance high-reliability communications network. It is contemplated that the present invention will provide benefit in the traffic management operations carried out by ATM switches of any architecture, as the present invention facilitates high data rate utilization of all links handled by switch 8, while fairly allocating the available bandwidth among all of the ABR channels using the switch. Examples of architecture types that may utilize the present invention include conventional processor-memory based approaches that receive all ATM traffic from, and forward ATM traffic to, line cards connected to an input/output bus, crosspoint architectures, Banyan and other multistage architectures, and hybrids of these various types.

FIG. 2 schematically illustrates the construction of one of ATM switches 8 according to the present invention. In this example, multiple physical layer interfaces $9_0$ through $9_k$ are provided, each connected to an physical ATM link over which ATM traffic is bidirectionally communicated. These physical links may include metal conductors such as coaxial cable or twisted pair lines, fiber optic facilities, wireless links, and the like. Each of physical layer interfaces 9 is thus specifically realized to provide the interface functionality for its particular physical link. Additionally, each physical link may communicate multiple virtual channels (VCs) of ATM traffic, in time-division multiplexed fashion. Each physical layer interface 9 is associated with a corresponding line interface, or line card, 10. Line cards 10 each perform conventional ATM communications processing, such as buffering and queuing of ATM packets, traffic policing and traffic shaping functions including the determination of whether incoming cells are conforming to the traffic contract (and, conversely, of controlling transmission so as to be conforming), scheduling of traffic and the like.

Each of the multiple line cards $10_0$ through $10_k$ interface with switch fabric 12; as is known in the art, switch fabric 12 performs the actual routing of ATM traffic from the source node to the appropriate destination of switch 8. Relative to FIG. 2, switch fabric 12 effectively routes traffic received at one of physical layer interfaces 8 to the line card 10 (and physical layer interface 9) associated with the destination for that traffic. Control processor 14 is connected to switch fabric 12, and has memory 15 associated therewith; the operation of control processor 14 in carrying out ABR flow control according to the preferred embodiments of the invention will be described hereinbelow. Switch fabric 12 of switch 8 in FIG. 2 is illustrated generically, as its actual architecture can vary quite widely. For example, switch fabric 12 may be implemented as a cross-point switching matrix, or as a multistage Banyan-style switch, in which case switch fabric 12 will be resident circuitry interfacing with line cards 10 as shown. Alternatively, switch fabric 12 may simply represent a backplane-style data bus, with the switching operations carried out by control processor 14 also resident on that bus, or carried out by processors resident on line interfaces 10 themselves. It is contemplated that those of ordinary skill in the art having reference to this specification will be readily able to implement switch 8 according to their desired architecture to include the flow control functionality described hereinbelow, according to any of these architecture styles or any other ATM switch architecture.

Control processor 14 of switch 8 in FIG. 2, according to the preferred embodiments of the invention, is contemplated to be a programmable microprocessor of sufficient processing capability to perform flow control and other traffic management functions, as described hereinbelow, in combination with general control of switch 8 itself. In that regard, control processor 14 may be a general purpose microprocessor, or alternatively may be realized as a digital signal processor (DSP) such as the TMS320c6x class of DSPs available from Texas Instruments Incorporated. The actual capability of control processor 14 will, of course, depend upon the level of functionality required not only by the flow control described herein, but also upon the extent to which control processor 14 itself carries out the switching operations. Memory 15 is preferably random access memory (RAM) for storing parameters relating to the operation of switch 8 and the VCs communicated thereby. According to the preferred embodiments of the invention, memory 15 also refers to read-only memory (ROM) or other fixed storage of program code and the like. As such, memory 15 of FIG. 2 refers, in general, to more than one physical memory type and resource.

As described above relative to the Background of the Invention, closed loop traffic management, particularly in setting the cell rates of Available Bit Rate (ABR) traffic, is accomplished by operation of switches 8, in cooperation with the sources and destinations of ATM traffic over the network. As noted above, fairness in the assignment of cell rates for ABR cells, particularly in the allocation of cell rates for over-subscribed links, is of particular concern in such traffic management. The present invention is directed to the efficient implementation of such a fairness approach, as will now be described in detail relative to its theory of operation.

As described above in the Background of the Invention, the under-subscribed bottleneck rate $BR_U$ of a link may be expressed as equation (7):

$$BR_U = r_1 + \frac{R - \sum_{l=1}^{k} m_l r_l}{m_1} \quad (7)$$

Accordingly, bottleneck rate $BR_U$ may be determined from the largest cell rate $r_1$ handled by the link, the number $m_1$ of flows having this largest rate $r_1$, and by the sum $$\sum_{l=1}^{k} m_l r_l$$

of the rates of all flows, where k is the number of distinct rates r (i.e., the length of the rate sequence for the link). According to the present invention, it has been observed that the under-scribed bottleneck rate $BR_U$ may thus be determined without knowledge of the individual rates r other than the largest rate $r_1$. After the under-subscribed case has been identified, and the rates of the flows adjusted to converge to the Max-Min fair rate allocation, the sum $$\sum_{l=1}^{k} m_l r_l$$

converges to R (the ABR bandwidth of the link) and the bottleneck rate BR is thus $r_1$, as flows with lower rates (l>1) are constrained elsewhere in the network.

In the over-subscribed case, however, the bottleneck rate $BR_O$ is specified by equation (3) described above:

$$BR_O = \frac{R - \sum_{l=l^*}^{k} m_l r_l}{N - \sum_{l=l^*}^{k} m_l} \quad (3)$$

According to conventional techniques, as described above, this equation requires knowledge of the entire sequence of rates r to determine l*, which is the level at which inequality (2) is satisfied.

According to the present invention, however, only a subset G of the entire sequence of rates r, along with the entire sum of rates $$\sum_{l=1}^{k} m_l r_l,$$

are stored and used in determination of the over-subscribed bottleneck rate $BR_O$. In those cases where level $l^* \leq G+1$, the computation of the over-subscribed bottleneck rate $BR_O$ according to equation (3) is not affected, as the sums therein may be determined from the stored rates (and sums), and thus bottleneck rate $BR_O$ may be exactly calculated. However, in those cases where level l* at which inequality (2) is satisfied is below the stored subset i.e., l*>G+1), the lack of stored rates $r_l$ requires the approximately that l*=G+1 to compute the over-subscribed bottleneck rate $BR_O$ (as no additional rate information is available). This, effectively, results in the assumption that all flows having a rate $r_l < r_G$ are constrained elsewhere in the network. Accuracy in the setting of flow rates in the first instance is thus somewhat dependent upon the accuracy of this assumption; however, the computational cost of deriving bottleneck rate $BR_O$ is reduced to on the order of G (i.e., O(G)).

According to the preferred embodiments of the present invention, subset G is reduced to the highest rate $r_1$, such that G=1, effectively assuming that l=2, and that therefore flows that have anything below the highest rate $r_1$ are constrained elsewhere in the network. Based upon this assumption, a bottleneck rate BR' for a link may be readily derived, by modifying equation (3), as follows:

$$BR' = \frac{R - \sum_{l=2}^{k} m_l r_l}{N - \sum_{l=2}^{k} m_l} = r_1 + \frac{R - \sum_{l=1}^{k} m_l r_l}{m_1} \quad (8)$$

According to the first preferred embodiment of the invention, if the second largest rate $r_2$ is less than the actual bottleneck rate BR, in the lock condition, estimated bottleneck rate BR' from equation (8) will return the exact bottleneck rate BR. However, it has been observed in connection with the present invention that often the second largest rate, and others in the sequence, actually exceed the exact bottleneck rate BR. This causes the sources of flows with these rates that are above the estimated bottleneck rate BR', and also have the true bottleneck rate BR, to reduce their rates $r_{l>2}$ more than is necessary when estimated bottleneck rate BR' is used directly.

According to the first preferred embodiment of the invention, however, this overcorrection is reduced by recognizing that the ratio R/N of total ABR bandwidth R to the total number of ABR flows N handled by the link is a lower bound on the true bottleneck rate BR. In other words, the bottleneck rate BR exactly equals R/N when all flows are constrained by the link under consideration, while the true bottleneck rate BR is necessarily greater than the ratio R/N when one or more flows are constrained elsewhere. According to the first preferred embodiment of the invention, therefore, an estimated bottleneck rate BR" for an over-subscribed link may be determined from:

$$BR'' = \max\left(\frac{R}{N}, r_1 + \frac{R - \sum_{l=1}^{k} m_l r_l}{m_1}\right) \quad (9)$$

The second argument in the max function of equation (9) is identical to the under-subscribed bottleneck rate $BR_U$ of equation (7), for the actual or assumed case of l*=2. However, it is readily observed, according to the present invention, that the under-subscribed bottleneck rate $BR_U$ of equation (7) is always greater than the ratio R/N (or, at least, is equal to this ratio). According to the preferred embodiments of the present invention, therefore, one may determine the bottleneck rate BR, using subset G=1, from:

$$BR = \max\left(\frac{R}{N}, r_1 + \frac{R - \sum_{l=1}^{k} m_l r_l}{m_1}\right) \quad (10)$$

The quality $r_1$, as noted above, is simply the largest rate, while the quantity $$\frac{R - \sum_{l=1}^{k} m_l r_l}{m_1}$$

is the surplus bandwidth of the link, divided equally among the flows $m_1$ with the largest rate $r_1$. It has been observed, by way of simulation of the first preferred embodiment of the invention described hereinbelow, that ABR sources managed according to this assumption will converge, after slight oscillation over a few measurement intervals, to cell rates that exactly match those derived according to a full Max-Min rate allocation.

To the extent that oscillation is present in this convergence, such oscillation is due to two reasons. In the case of an over-subscribed link, the assumption of G=1 as in equation (10) will return a bottleneck rate BR that will not only reduce the rate of the largest rate $r_1$ by an amount necessary to end the over-subscription, but will also reduce some of the lower rates $r_{l>2}$, causing a larger than required reduction in utilization of the link. Conversely, in the under-scribed case, the bottleneck rate BR may be larger than necessary. These errors in estimation of the bottleneck rate BR according to the present invention may cause transient oscillation in the link utilization.

However, it is contemplated, and has been observed through simulation, that convergence is rapidly attained according to the present invention. Firstly, as noted above, this approach correctly determines the bottleneck rate at a lock condition of l*=2, which is the case where all but the largest rate flows are constrained at links other than the current link under consideration, and the bottleneck rate BR is larger than the second largest rate. This situation is intuitively correct, as all flows that are not constrained by the current link thus receive a fair, equally-divided, share of the available bit rate. Secondly, in the event that the link under consideration is under-subscribed or over-subscribed, the determination of the bottleneck rate BR causes the flows to appropriately increase or decrease their rates, respectively, providing negative feedback to the system. Additionally, stability in the network is maintained even in the case where a given link over-estimates its bottleneck rate BR, because this error does not affect the determination of the bottleneck rates BR at links having lower bottleneck levels; furthermore, because of the lower bound on the bottleneck rate set by the ratio R/N, lowest bottleneck links cannot underestimate their bottleneck rates, and as such higher level bottleneck links will necessarily determine their bottleneck rate. Accordingly, it is contemplated that, according to the preferred embodiments of the invention, persistent oscillations will not occur, and fairness in cell rate assignment will be reached.

Figure 3:
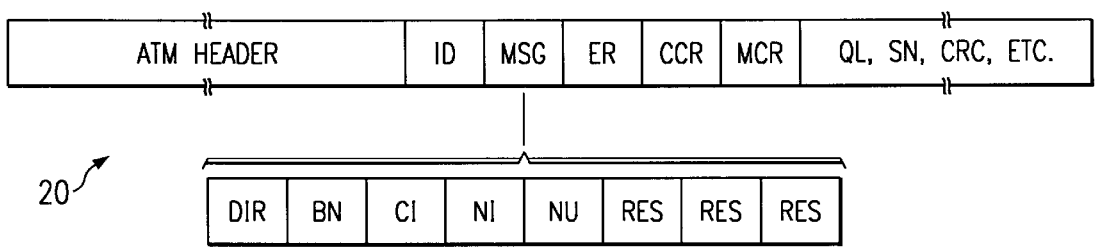
FIG. 3 is a schematic illustration of an arrangement of a Resource Management ATM cell as utilized in connection with the preferred embodiment of the present invention.

Referring now to FIG. 3, the definition of a resource management (RM) cell as utilized in connection with the preferred embodiments of the invention will now be described. As is known in the art, RM cells may be forward-traveling (from source to destination) or backward-traveling (from destination or from a switch to the source); the backward-traveling RM cells provide feedback to the source to adjust cell rates and to effect other control. According to the preferred embodiments of the invention, invitations to increase cell rate and requests to decrease cell rate are generated by switch 8, and communicated to the source of ATM traffic by way of such backward-traveling RM cells.

FIG. 3 illustrates RM cell 20 for an ATM traffic flow, or virtual channel (VC), specifically an RM cell as used in the management of an ABR flow, and arranged according to the preferred embodiments of the invention. RM cell 20 of FIG. 3 is a 53 byte packet, consistent with the ATM protocol. Unlike ATM data cells, which include 45 bytes of payload in combination with an eight-byte header, RM cell 20, as is typical for conventional RM cells, consists essentially of control information. The control information included within RM cell 20 includes information forwarded by the source of the ATM VC when RM cell 20 is forward-traveling, and includes feedback and control information generated by an ATM switch such as switch 8 or by the destination of the ATM VC, when RM cell 20 is backward traveling.

In the example of FIG. 3, RM cell 20 includes an ATM header, typically within the first six bytes, which includes the appropriate ATM header information specified by the appropriate ATM specification. Byte ID, which follows the ATM header, includes a protocol identifier to identify the service class with which RM cell 20 is associated; in the current specification, an identifier ID value of 1 indicates ABR service.

Byte MSG corresponds to a message type field, and includes bits that are set or not set, depending upon the type of message being conveyed by RM cell 20. As shown in FIG. 3, and as specified in the current ATM specification, bit DIR indicates the direction of data flow associated with the RM cell (i.e., forward or backward-traveling). Bit BN indicates, when set, that the current instance of RM cell 20 is a Backward Explicit Congestion Notification cell, as known in the art. Bit CI, when set by a network element, indicates that congestion is present in the network, in response to which (if the current instance of RM cell 20 is backward-traveling) the ATM source will reduce its Allowed Cell Rate (ACR) which, as known in the art, is the current rate at which the source allows itself to send ATM traffic. Bit NI indicates, when set and when present in a backward-traveling RM cell 20, that the source is not to increase its ACR; however, but NI does not necessarily request a ell rate decrease. Bit AR is not used in the ABR traffic, nor are the reserved bits RES.

Referring back to the body of RM cell 20 in FIG. 3, field ER is a two-byte field in which an explicit cell rate is communicated. For forward-traveling RM cell 20, field ER will contain an explicit cell rate that is less than the Peak Cell Rate (PCR) for the flow; for backward-traveling RM cells 20, field ER is a cell rate that switch 8 or another network element effecting traffic management uses to specify, to the ATM source, the desired cell rate for the associated flow. The lowest ER field received by the source will thus define the constraint rate of the associated VC. Field CCR communicates the current cell rate of the flow (and as such is included in forward-traveling cells only), while field MCR communicates the minimum cell rate for the associated flow. According to conventional ATM protocol, these rates are communicated in a binary floating point representation, as a number of cells per second. The remainder of RM cell 20 includes additional control information as is conventional in the ATM art, including queue length, sequence number, and CRC error-correction information.

Figure 4:
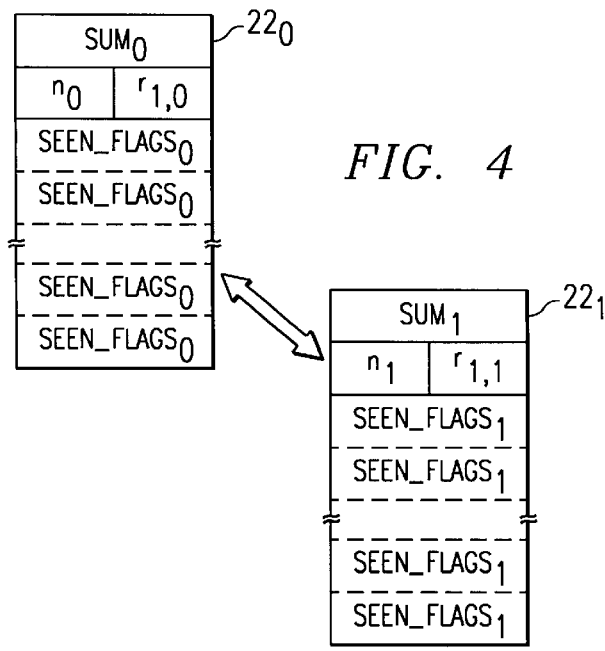
FIG. 4 is a memory map, illustrating multiple arrays of the memory of the ATM switch as utilized in connection with a first preferred embodiment of the present invention.

Referring now to FIG. 4, memory 15 of switch 8 of FIG. 2 includes, for each link, a pair of trays $22_0$, $22_1$ that store parameters used by control processor 14 in effecting flow control process according to a first preferred embodiment of the invention. As noted above, switch 8 interferes with multiple. ATM links, by way of line cards 10 and physical layer interfaces 9, and as such memory 15 will include multiple pairs of such arrays 22 within its address space. It is contemplated, of course, that those or ordinary skill in the art will be readily able to incorporate the necessary number of links into memory 15, as many handled by switch 8. Or course, memory 15 of switch 8 will also be used for storage of many other parameters related to operation of switch 8, including as necessary for effecting traffic management operations. Furthermore, given that arrays 22 are associated with the flows handled by specific links, it is contemplated that arrays 22 may be resident within memory resources implemented in line interfaces 10, in which case each line interface 10 will contain the array associated with the flows communicated through its respective link. The location of arrays 22 thus depend upon the particular switch architecture, as noted above.

Referring back to FIG. 4, array $22_0$ includes a field $SUM_0$ for storing a numerical value corresponding to the sum $$\sum_{l=1}^{k} m_l r_l$$

of the rates of all flows handled by switch 8 for a given link L. Array $22_0$ also includes a field $r_{1,0}$ for storing the highest cell rate $r_1$ of the flows communicated through link L, and also a field $m_{1,0}$ for storing the number of flows $m_1$ that are operating at this highest cell rate $r_1$. Array $22_0$ further includes fields $SEEN\_FLAGS_0$ which store a flag SEEN for each of the flows being handled by link L. Array $22_1$ similarly includes field $SUM_1$, $r_{1,1}$, and $m_{1,1}$, along with fields $SEEN\_FLAGS_1$, also associated with link L. The duplicate arrays $22_0$, $22_1$ are included in memory 15, according to this first preferred embodiment of the invention, to permit the updating of the fields SUM, $r_1$, $m_1$ during the same measurement period in which changes in cell rates are communicated to the ATM sources based on the most recently calculated bottleneck rate. In other words, one of arrays 22 will be in the process of being updated while the other one of arrays 22 is used to generate the new bottleneck rate and request or invite changes in cell rates from the sources. This dual array approach minimizes overall computational time required for performing the traffic management process of the present invention.

Figure 5:
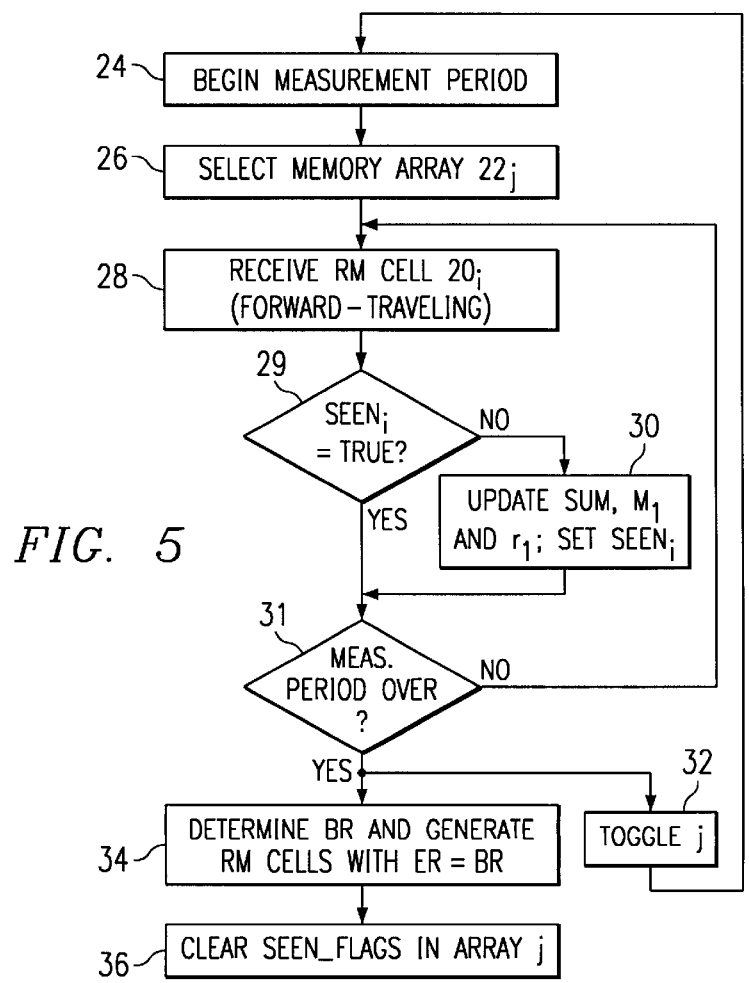
FIG. 5 is a flow chart, illustrating the operation of the ATM switch of FIG. 2 according to the first preferred embodiment of the present invention.

Referring now to FIG. 5, the operation of switch 8 in performing the traffic management function according to the first preferred embodiment of the present invention will be described in detail. The operations illustrated in FIG. 5 are performed for a given link L which, of course, is only one of many links being handled by switch 8, and as such the procedure of FIG. 5 may be performed either in parallel or sequentially with a similar procedure for the other links in the network. In any case, the procedure according to this first preferred embodiment of the invention is a distributed approach, in that each link is able to determine its own bottleneck rate BR based upon the flows that it carries, without requiring knowledge of the bottleneck rates and constraint rates of other links and flows in the network. It is contemplated, based on the example of FIG. 2 described hereinabove, that control processor 14 of switch 8 will be readily capable of performing the traffic management procedure according to this first preferred embodiment of the invention, and as such the following description will make reference to actions taken by control processor 14. Of course, as noted above, different processing hardware may alternatively be utilized to perform these functions, with the location of such hardware dependent upon the particular switch architecture.

The operation of switch 8 according to this preferred embodiment of the invention begins, in process 24, with the initiation of a measurement period. The measurement period that commences in process 24 is preferably selected to correspond to a time that permits each flow, or VC, handled by link L to have communicated at least one RM cell 20; as will become apparent from the following description, the bottleneck rate calculation will be erroneous if rates from each of the flows are not considered. Of course, the measurement period cannot be so long as to render the traffic management function non-responsive. It is contemplated that those of ordinary skill in the art will be able to select an appropriate measurement period, given the traffic levels and expected rates of RM communication for the network, and using some amount of statistical design. In process 26, control processor 14 selects one of the two arrays $22_0$, $22_1$ for updating during the measurement period that commenced with process 24, with such selection made in response to an index j that toggles between 0 and 1. For purposes of this description, the exemplary operation will be described with index j having an initial value of 0. At this point the process, all of the SEEN flags in array $22_0$ are clear.

In process 28, switch 8 detects the arrival of a forward-traveling RM cell $20_i$, generated by the source of the ATM traffic for a particular flow $F_i$. As described above relative to FIG. 3, RM cell $20_i$ includes information relative to the current cell rate (CCR) for flow $F_i$, as will as other parameters relating to the ABR class of traffic. Control processor 14 next, in decision 29, interrogates flag $SEEN_i$ in the approach field $SEEN\_FLAGS_0$ or array $22_0$, to determine the state of this flag. If an RM cell $20_i$ has already been received for flow $F_i$ in the current measurement period, its flag $SEEN_i$ in array $22_0$ will have been set (i.e., decision 29 is YES), and control will pass to decision 31. However, if flag $SEEN_i$ of array $22_0$ is not set, no RM cell $20_i$ for flow $F_i$ has yet been received during the current measurement period, and decision 29 returns a NO. Control then passes to process 30, in which control processor 14 updates fields SUM, $r_{1,0}$, and $m_{1,0}$ in array $22_0$, as will now be described.

In process 30, control processor 14 interrogates the current cell rate (CCR) field of RM cell $20_i$ to determine whether the cell rate in this field is greater than or equal to the highest cell rate received in the current measurement period. If so, highest rate field $r_{1,0}$ is set to equal the CCR from RM cell $20_i$ (if not already at this cell rate from another flow of equal CCR), and the value of field $m_{1,0}$ is set to the value one (as flow $F_i$ is the first flow having this highest rate). If the CCR field of RM cell $20_i$ equals the current value of highest rate field $r_{1,0}$, the value of field $m_{1,0}$ is incremented, advancing the count of those flows having the highest rate. Whether or not the CCR of RM cell $20_i$ is the highest cell rate yet measured in this period, field $SUM_0$ is updated by adding the CCR of RM cell $20_i$ thereto. Finally, flag $SEEN_i$ is set by control processor 14, in field $SEEN\_FLAGS_0$ of array $22_0$, completing process 30. Control then passes to decision 31.

In decision 31, control processor 14 determines whether the current measurement period has expired. If not (decision 31 is NO), control passes back to process 28 to await the arrival of the next RM cell 20 for one of the flows handled by link L, from which point the process repeats.

Upon the expiry of the current measurement period (decision 31 is YES), two parallel actions are carried out by control processor 14. One of these actions passes control to process 32, in which the array index j is toggled to the other side (in this example, to j=1). Control then passes back to process 24, in which the measurement period again commences, and array $22_j$ (in this example) is used to again update fields SUM, $r_1$, and $m_1$. In parallel with the new measurement period, the values of $SUM_0$, $r_1$, and $m_1$ stored in array $22_0$ are used to determine the next value of the bottleneck rate for link L.

As described above, the bottleneck rate BR of link L according to this first preferred embodiment of the invention is calculated, in process 34, by control processor 14 executing instructions corresponding to equation (10):

$$BR = \max\left(\frac{R}{N}, r_1 + \frac{R - \sum_{l=1}^{k} m_l r_l}{m_1}\right) \quad (10)$$

These calculations are performed, in this example where array $22_0$ was most recently updated, by control processor 14 executing, in process 34, arithmetic instructions upon the corresponding fields in array $22_0$ as follows:

$$BR = \max\left(\frac{R}{N}, r_{1,0} + \frac{R - SUM_0}{m_{1,0}}\right) \quad (11)$$

where total bandwidth R and the total number of flows N are known values for link L, either selected a priori or, in the case of flows N, control during update processes 28, 30. This bottleneck rate BR, one calculated, can be used to set explicit rate field ER in backward-traveling RM cells generated by, or traveling through, switch 8 for each flow handled by link L, and communicated to the respective source of the ATM traffic for those flows. According to this preferred embodiment of the present invention, bottleneck rate BR is preferably an upper bound upon the value communicated by field ER, such that if field ER is set to bottleneck rate BR if its current value is greater than bottleneck rate BR, but is modified if its current value is less than bottleneck rate BR (as the flow is constrained elsewhere). For flows that are constrained by link L, the explicit cell rate ER field in these backward-traveling RM cells generated by switch 8 will serve to modify the current cell rate CCR field for the flows, and thus provide feedback regarding the available bandwidth of link L thereto.

Referring back to FIG. 5, following process 34, control processor 36 then performs process 36 to clear all flags SEEN in fields $SEEN\_FLAGS_0$ of arrays $22_0$, in this example. Process 36 thus prepares array $22_0$ for the next measurement period, during which array $22_1$ will be used in process 34 to generate the next value of bottleneck rate BR, and during which array $22_0$ will again be updated with values for fields SUM, $r_i$, and $m_1$.

As is evident from the foregoing, the flow control method according to this first preferred embodiment of the invention effectively determines the bottleneck rate BR by allowing flows to increase their cell rates, or asking flows to decrease their cell rates, over a sequence of measurement periods. If the bottleneck rate BR for a link is greater than the Peak Cell Rate (PCR) of one or more flows communicated by the link, once the PCR for a flow is exceeded by the largest rate $r_1$, the flow is considered to be constrained by another link in the network (i.e., by the source, through its setting of the PCR). As a result, the PCR limits specified in the traffic contact for each flow are taken into consideration by the flow control method according to the preferred embodiment of the invention.

The computational cost of performing the flow control operation according to this first preferred embodiment of the invention is on the order of O(1), as only the single rate calculation process 34 is performed. Updating of the arrays of flags SEEN, as well as the incremental updating of the fields SUM, $r_1$, $m_1$, require on the order of N operations, but the use of two arrays 22 to permit updating of one array 22 while the other array 22 is in use for generating the bottleneck rate and RM cells greatly reduces the computational cost of this approach, such that this flow control can be readily carried out in real-time, without disrupting communications. Furthermore, the preferred embodiment of the invention does not require storage of individual cell rates for each of the flows handled by each of the links, as the fields SUM, $r_1$, $m_1$ may be incrementally updated upon the receipt of forward-traveling RM cells according to the present invention. It is therefore contemplated that the present invention will be quite beneficial when applied to ATM traffic management operations, such as carried out in ATM switches and other network elements.

As noted above, the duration of the measurement interval over which the bottleneck rate is calculated is important in the accuracy, stability, and responsiveness of the flow control operation. A short measurement interval, of course, provides a high degree of responsiveness, in that the network and its links can detect overload and underload conditions soon after they occur, and can then promptly take action to cause the flows to increase or decrease their rates accordingly, thus minimizing the duration of any congestion or underutilization that may occur due to transient events. However, accurate determination of the bottleneck rates required that at least one RM cell is received and analyzed during each measurement periods; if RM cells are missing from the bottleneck rate calculation, bottleneck rate changes may be larger than optimal, causing oscillations in cell rates and queue buffer overflow. Secondly, excessively short measurement periods can cause overshoot in the changes of ABR cell rates in response to short-lived changes in CBR and VBR flows (which, as discussed above, have priority over ABR flows in assignment of bandwidth). This overshoot can result in unstable flow control response. The risk of inaccuracy in the bottleneck rate determination, and of instability in flow control, increases with decreasing measurement periods.

According to a second preferred embodiment of the present invention, measurement intervals of differing duration are used to improve the responsiveness of the flow control process for high cell rate ABR flows, while ensuring that sufficient time is provided to receive and process resource management (RM) cells for lower data rate flows. Preferably, as noted below, these measurement periods are "nested", such that the longer measurement periods are integral multiples of the shorter measurement periods, with the longest measurement period preferably being longer than the lowest RM cell frequency. According to the current ATM specifications, each flow must issue at least one RM cell every 100 msec. According to this second preferred embodiment of the invention, therefore, the outermost, or longest, measurement interval is preferably at least as long as 100 msec, to ensure that at least one RM cell from each flow is received in the determination of the bottleneck rate. These nested measurement periods have the effect of "low-passing filtering" the flow control operation and the determination of bottleneck rate, while maintaining a reasonable degree of responsiveness.

According to this second preferred embodiment of the present invention, each higher level, longer, measurement period $T_k$ includes an integral multiple M of the next lower level measurement periods $T_{k-1}$. The general relationship among the nested measurement periods T may be expressed as follows:

$$T_k = T_0 M^k \quad (12)$$

Figure 6:
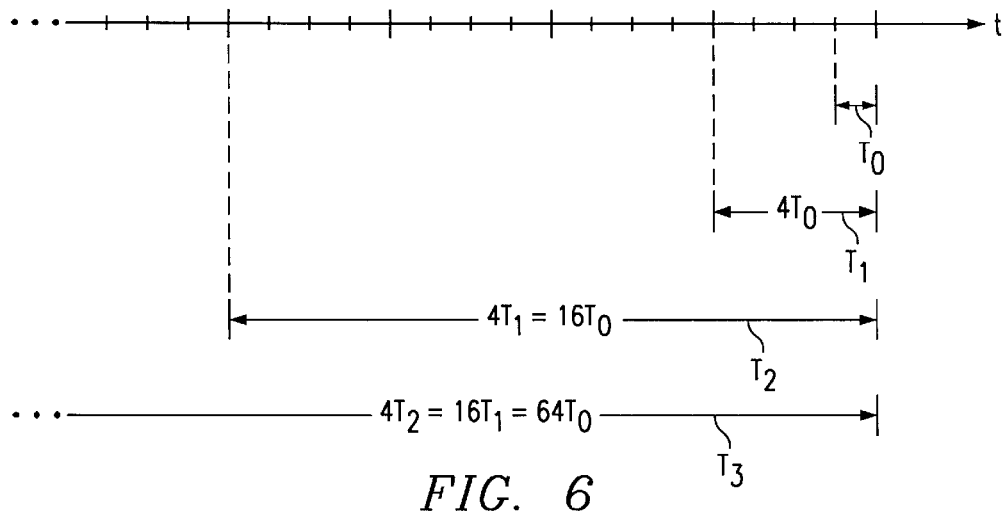
FIG. 6 is a time plot illustrating the relationship among the nested measurement periods used according to a second preferred embodiment of the present invention.

FIG. 6 illustrates a exemplary set of nested measurement periods $T_0$, $T_1$, $T_2$, $T_3$ as may be used according to this second preferred embodiment of the invention. In this example, measurement period $T_2$ includes four measurement periods $T_1$, and sixteen of the shortest measurement periods $T_0$, such that M=4. Longer measurement periods $T_{k>3}$ may, of course, be generated in a similar manner. In each case, however, the expiration of any measurement period $T_k$ coincides with the expiration of all lower level measurement periods $T_{k-1}, T_{k-2}, \ldots, T_0$.

Once a set of measurement periods T of varying level k are defined, one may associate an ATM traffic flow with one of the levels, using the Current Cell Rate (CCR) field of an RM cell 20 according to the flow. A flow $F_i$ may be associated with a level k by the expression:

$$k = \log_M \left\lfloor \frac{N_{rm}}{CCR \cdot T_0} \right\rfloor + 1 \quad (13)$$

where the quantity $N_{rm}-1$ is the number of data cells between consecutive RM cells $20_i$ for flow $F_i$, such that the quantity $$\frac{N_{rm}}{CCR}$$

states the inter-arrival time of RM cells $20_i$ for flow $F_i$. This ratio thus must be strictly smaller than the duration of the level k measurement interval $T_0 M^k$. Alternatively, therefore, and preferably according to this second embodiment of the invention, a flow $F_i$ can be assigned to a level k by comparing its $CCR_i$ with a series of minimum flow rates $RL_k$ that are defined as:

$$RL_k = \frac{N_{rm}}{T_0 M} \quad (14)$$

This comparison assigns flow $F_i$ to level k if and only if its $CCR_i$ satisfies:

$$RL_{k-1} \geq CCR_i > RL_k \quad (15)$$

A table of cell rates values can thus be readily established for a given set of nested measurement periods $T_k$, against which cell rate values $CCR_i$ may be compared for determination of the level k of their respective flows. For example, if shortest measurement period $T_0$ is one msec, and for M=4, cell rates $RL_k$ will correspond to the following:

| Measurement Period (T$_k$) | Cell Rate (RL$_k$) |
|---|---|
| T$_0$ = 1 msec | 434.24 Mb/s |
| T$_1$ = 4 msec | 108.56 Mb/s |
| T$_2$ = 16 msec | 27.14 Mb/s |

-continued

| Measurement Period (T$_k$) | Cell Rate (RL$_k$) |
|---|---|
| T$_3$ = 64 msec | 6.79 Mb/s |
| T$_4$ = 256 msec | 1.70 Mb/s |

As noted above, the longest measurement period $T_4$ exceeds 100 msec, such that at least one RM cell 20 will be received from even the slowest flow.

According to this second preferred embodiment of the present invention, bottleneck rates are calculated upon the expiration of each measurement period $T_{k^*}$. In those events when $k^*$ is not the highest level, new RM cells 20 for the flows associated with higher levels $k^*+1$, $k^*+2$, etc., than level $k^*$ of the expiring period $T_{k^*}$ will not necessarily have been received by switch 8 at the this expiration time. According to the second embodiment of the invention, therefore, a pair of aggregate rates $R_k$ and numbers of flows $N_k$ are stored for each level k in the nesting; these aggregates $R_k$, $N_k$ are intended to approximate the aggregate rates and numbers for level k, but are approximations because exact values for these quantities will not be available until expiration of the corresponding measurement period $T_k$. These aggregate approximations $R_k$, $N_k$ will be used in the determination of the sum $$\sum_{l=1}^{k} m_l r_l$$

of the rates for all the flows F handled by a given link, and thus used in the generation of bottleneck rate BR, according to the second preferred embodiment of the present invention, the theory of operation of which will now be described. Following this discussion of the theory of operation, a detailed description of the execution of this second preferred embodiment of the present invention by ATM switch 8 will then be provided.

The theory of operation of this second preferred embodiment of the invention is based upon measurements made, at each link in ATM switch 8, during each measurement period $T_k$ in each of multiple levels k, nested in the manner described above. The rate levels $RL_k$ are determined a priori at ATM switch 8, from the minimum measurement period $T_0$ and multiple M.

At the beginning of a measurement period $T_k$ of level k, a stored value of aggregate rate $R_k$ corresponding to the sum of the cell rates for each flow of level k, and a stored value of the number of flows $N_k$ of level k, are each initialized to zero. Upon receipt by switch 8 of a forward traveling RM cell $20_i$ for a flow $F_i$, the Current Cell Rate field $CCR_i$ for this flow is interrogated and compared against the rate levels $RL_k$ to determine the level k to which the flow $F_i$ belongs. If the newly received RM cell $20_i$ is the first RM cell received for flow $F_i$ during the current measurement period $T_k$ for the associated level k just determined, the value $CCR_i$ is added to the stored aggregate rate value $R_k$ for level k, and the stored value $N_k$ of flows of level k is incremented. This updating continues during the various measurement periods $T_k$ for all levels k, upon receipt of each RM cell $20_i$.

As noted above, the expiration of a measurement period $T_k$ for level k is coincident with the expiration of all lower level measurement periods $T_{k-1, k-2}, \ldots T_0$. Upon expiration of measurement period $T_{k^*}$ (and thus of all shorter measurements levels $T_{k^*-1}, T_{k^*-2}, \ldots T_0$), the bottleneck rate BR is computed by switch 8 in a manner similar to that described above relative to the first embodiment of the invention. As described above, the bottleneck rate BR is determined according to the first embodiment of the invention as:

$$BR = \max\left(\frac{R}{N}, r_1 + \frac{R - \sum_{l=1}^{k} m_l r_l}{m_1}\right) \quad (10)$$

However, when nested measurement periods $T_k$ are used, the sum $$\sum_{l=1}^{k} m_l r_l$$

of the rates for all of the flows is not available, as at least some of the measurement periods $T_{k>k^*}$ have not yet expired.

According to this second preferred embodiment of the invention, the ATM switch retains saved copies of the aggregate number of flows $N_k$ and aggregate rages $R_k$ for each level k as determined from the previous measurement period $T_{k^*}$; meanwhile, during the current measurement period $T_k$ (which may not have yet expired), new values of these aggregates $N_k$, $R_k$ are being generated for use in the next successive measurement period $T_k$. These save values $SN_k$, $SR_k$ of aggregate values $N_k$, $R_k$, for levels k greater than the expired level k*, which were produced in the previous instance of their respective measurement periods, are instead used in generating the overall sums.

It is possible that the cell rates of flows of level k' in the previous measurement period $T_{k'}$ may have either increased into a higher cell rate level k<k', or slowed into a lower cell rate level k<k'. Use of the saved values $SN_k$, $SR_k$ in bottleneck rate determination may therefore not be appropriate. According to this second preferred embodiment of the invention, therefore, upon detection of a flow moving from level to level, the saved values $SN_k$, $SR_k$ from the previous measurement period $T_k$ will be decremented by the new rates for such flows, prior to determination of the bottleneck rate BR.

Figure 7:
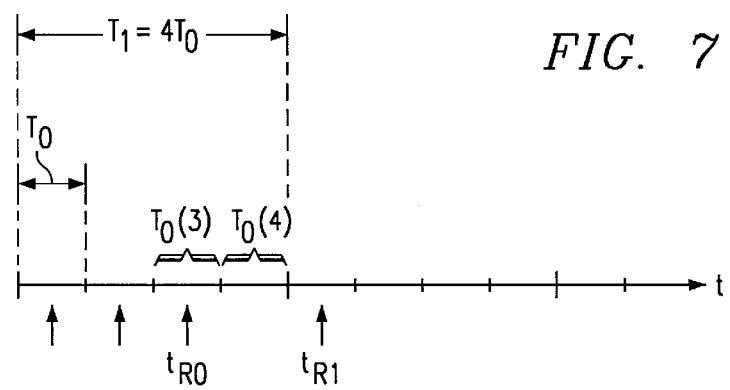
FIG. 7 is a time plot illustrating an instance by way of which an ATM flow changes rate level.

It is also possible, according to this second embodiment of the present invention, that a flow $F_i$ may reduce its cell rate $CCR_i$ to a lower level k<k' in such a way that its corresponding RM cell $20_i$ is not visible to switch 8. FIG. 7a illustrates an example of such a situation, for a simplified two-level nesting of measurement periods $T_0$, $T_1$, where period $T_1$ is made up of four periods $T_0$. In this example, an RM cell $20_i$ is received for flow $F_i$ in each measurement period $T_0$, including at time $t_{R0}$ in measurement period $T_0(3)$. At this time, flow $F_i$ changes its cell rate $CCR_i$ so as to now become a slower, level k=1, flow. Accordingly, no RM cell $20_i$ for flow $F_i$ is received by switch 8 during measurement period $T_0(4)$, and indeed is not received by switch 8 until time $t_{R1}$ during the next instance of measurement period $T_1$. Because no RM cell $20_i$ is received for flow $F_i$ during the level k=0 interval $T_0(4)$, however, flow $F_i$ will not be counted either as a level k=0 flow at the expiration of interval $T_0(4)$, nor will flow $F_1$ be present in the saved values $SN_1$, $SR_1$ (as flow $F_i$ was not a level k=1 flow in the previous instance of measurement period $T_1$). Flow $F_i$ will, in this case, be invisible to the bottleneck rate BR computation occurring at the close of measurement period $T_0$, and the computation will thus be erroneous.

According to this second preferred embodiment of the invention, an approximation $NI_k$ for the number of level k flows that were previously at a lower level k−1 and that have reduced their rates can be made, at the close of a level k−1 measurement period $T_{k-1}$, as follows:

$$NI_k = SN_{k-1} - N_{k-1} \quad (16)$$

This value $N_k$ is an approximation, considering that a flow may have reduced its rate by an amount that is more than a single level change; however, it is contemplated that error due to multiple-level changes will be short-lived (i.e., no longer than the next receipt of a corresponding RM cell $20_i$ for flow $F_i$). In effect, any such flow $F_i$ with a drastic rate reduction will be effectively reduced by a single level for each measurement interval, until the RM cell $20_i$ in fact arrives. Using this approach, the total number $N_T$ of flow traversing the link may be approximated by:

$$N_T = \sum_k SN_k \quad (17)$$

considering that each previously existing flow $F_i$ appeared in at least one of the levels. Similarly, the aggregate rate $R_T$ of all flows F, at the expiration of measurement period $T_{k^*}$, may be approximated by:

$$R_T = \sum_{k \leq k^*} R_k + \sum_{1 \leq k \leq k^*} (SN_k - N_k) RL_k + \sum_{k > k^*} SR_k \quad (18)$$

This addition is the sum of all current rate values $R_k$ for levels k less than or equal to the level k* of the expiring measurement period k*, with all of the saved rate values $SR_k$ for all higher levels k>k* (corresponding to measurement levels $T_k$ not yet expired), and an estimate of the rates of flows F that have changed levels. This estimate of the rates of changed-level flows is made by counting the differences between the saved and actual counts for each expiring level less than or equal to k*, each times the minimum rate $RL_k$ for the associated level.

According to this second preferred embodiment of the present invention, the bottleneck rate BR is then calculated as follows:

$$BR = \max\left(\frac{R}{N_T}, r_1 + \frac{R - R_T}{m_1}\right) \quad (19)$$

The bottleneck rate BR is then communicated by switch 8 to the source of flows F, as the value of the Explicit Rate (ER) field in backward-traveling RM cells associated therewith, as discussed above.

Figure 8:
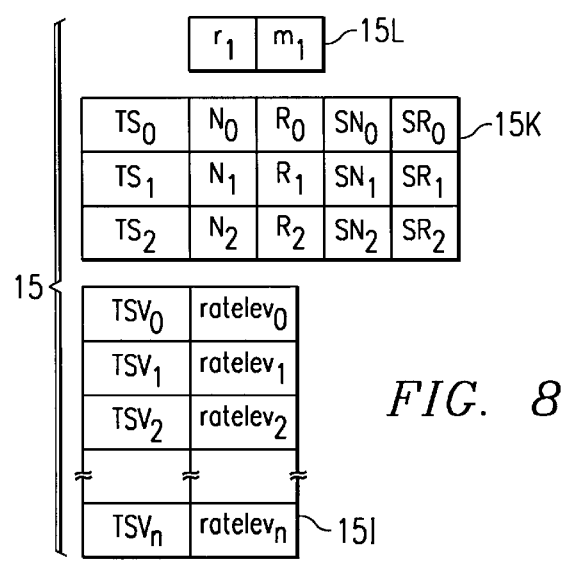
FIG. 8 is a memory map, illustrating locations in the memory of the ATM switch as utilized in connection with the second preferred embodiment of the present invention.
Figure 9:
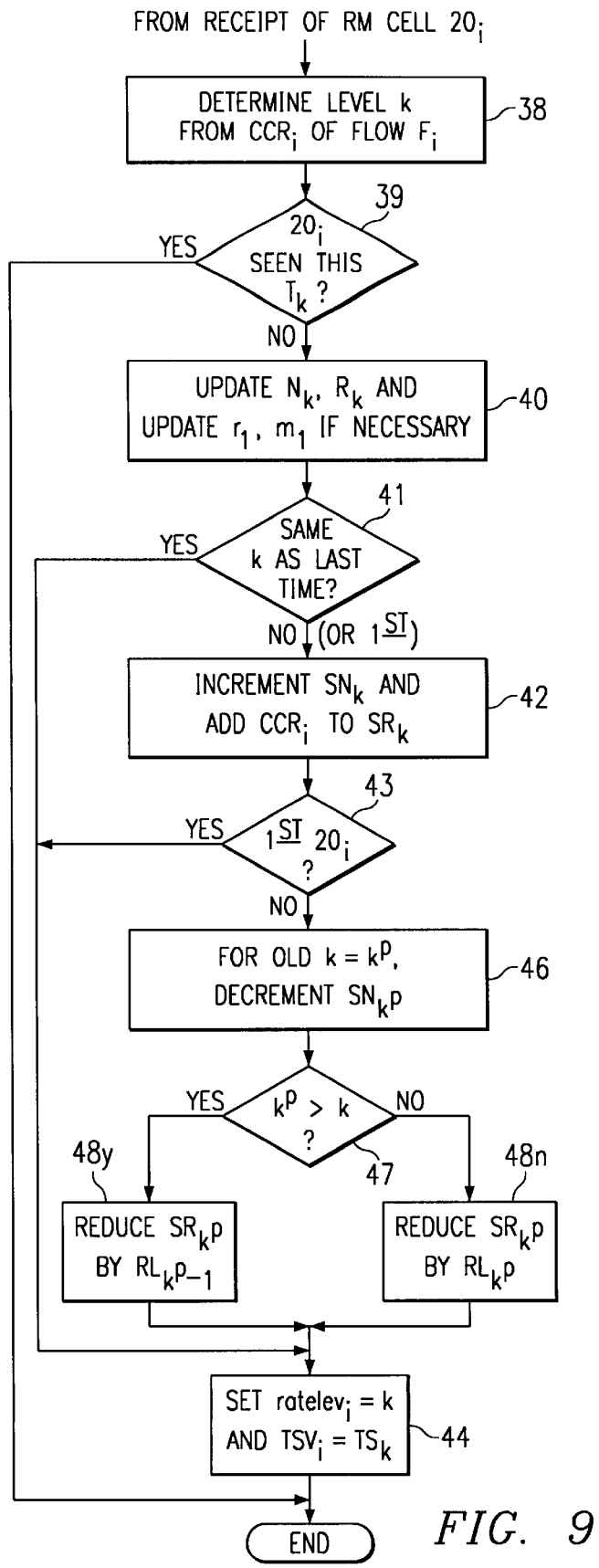
FIG. 9 is a flow chart illustrating the operation of the ATM switch of FIG. 2 in processing a received RM cell, according to the second preferred embodiment of the present invention.
Figure 10A:
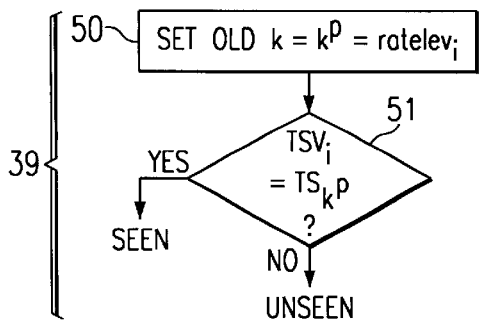
FIGS. 10a and 10b are flow charts illustrating the operation of the ATM switch of FIG. 2 in performing decisions in the process of FIG. 9.
Figure 10B:
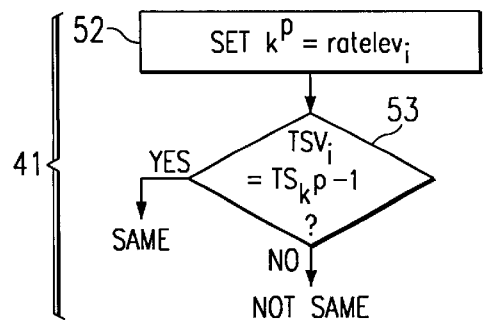
Figure 11:
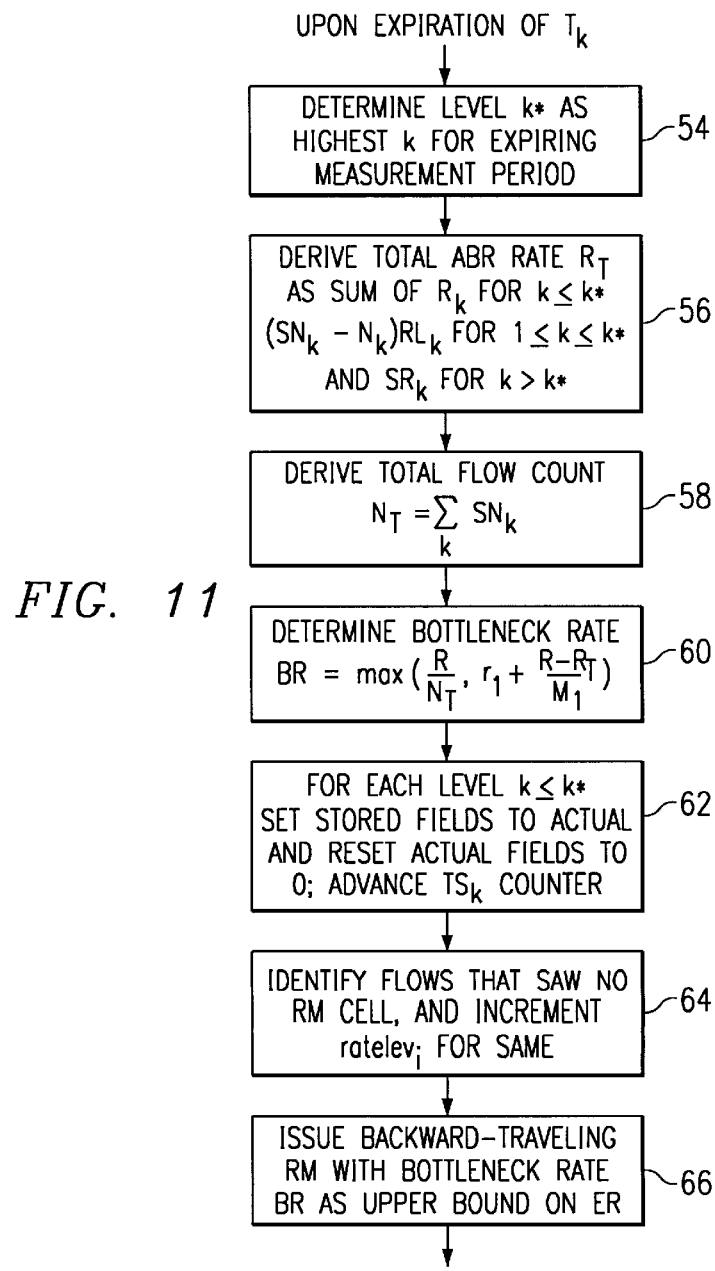
FIG. 11 is a flow chart illustrating the operation of the ATM switch of FIG. 2 in determining an ABR bottleneck rate, according to the second preferred embodiment of the present invention.

Referring now to FIGS. 8 through 11, the operation of switch 8 in performing the traffic management function according to this second preferred embodiment of the present invention is described in detail. As in the case of the first preferred embodiment of the invention, the operations illustrated in FIGS. 9 through 11 are performed for a given link L which, of course, is only one of many links being handled by switch 8, and as such the procedure of FIG. 8 may be performed either in parallel or sequentially with a similar procedure for the other links in the network.

As described above relative to the first preferred embodiment of the invention, the method according to this second preferred embodiment of the present invention may be performed by control processor 14 of switch 8 (as shown in FIG. 2), in combination with memory 15. Also as discussed above, this second preferred embodiment of the invention may be performed in ATM switch 8 constructed according to any one of a number of switch architectures, including the back-plane type of processor-memory based architectures as suggested by FIG. 2, as well as line cards connected to an input/output bus, crosspoint architectures, Banyan and other multistage architectures, and hybrids of these various types.

FIG. 8 illustrates a portion of the address space of memory 15 associated with a link L managed by switch 8 in connection with this second preferred embodiment of the invention. According to this embodiment of the invention, memory 15 includes a portion 15L for storing values that are associated with all flows carried by link L; in this example, portion 15L includes field $r_1$ for storing the highest cell rate $r_1$ of the flows communicated through the link, and also a field $m_1$ for storing the number of flows $m_1$ that are operating at this highest cell rate $r_1$. Of course, one such portion 15L is provided for each of the links managed by switch 8.

Also associated with link L in memory 15 is memory portion 15K. Portion 15K includes one entry for each level k of nested measurement periods $T_k$, each such entry having several fields therein. In the example of FIGS. 8 and 9, three nested measurement periods $T_0$, $T_1$, $T_2$ are used, and as such the level indicator k may vary from 0 to 2; portion 15K thus includes three entries, one for each available level k. According to this embodiment of the invention, the entry corresponding to level k=0 includes a field $TS_0$, which is a two-bit (i.e., modulo-4) counter that is advanced upon the expiration of each measurement period $T_0$; the entries corresponding to levels k=0 and k=1 respectively include fields $TS_1$, $TS_2$, which are also two-bit counters advanced upon the expiration of the respective measurement periods $T_1$, $T_2$. Portion 15K further includes, for each of its entries, a field $N_k$ for storing the number of flows F that have cell rates corresponding to level k, and a field $R_k$ for storing the aggregate cell rate of these flows F corresponding to level k, both values determined during the current measurement period $T_k$. As discussed above, each entry in portion 15K also includes field $SN_k$ for storing the number of flows F of level k, and field $SR_k$ for storing the aggregate cell rate of these flows F, both values as determined during the most recent completed previous instance of measurement period $T_k$.

Memory 15 further includes, in portion 15I according to this embodiment of the invention, an entry for each flow $F_i$ that is being communicated through the present link L. As illustrated in FIG. 8, two fields are contained within each of the entries of portion 15I. Field $TSV_i$ stores a timestamp value that indicates the contents of a corresponding one of counter fields $TS_k$ at the time that the corresponding flow $F_i$ was associated with cell rate level k; field $ratelev_i$ indicates the identity of level k associated with flow $F_i$. One possible value for field $ratelev_i$ is "unseen", which is a special value not corresponding to any possible level k, and which indicates that an RM cell $20_i$ has not yet been "seen" by switch 8 (i.e., its flow $F_i$ is new to this link L). The number n of the entries in portion 15I corresponds, of course, to the number of ABR flows $F_i$ being managed by switch 8 for link L.

The provision of timestamp field $TSV_i$ for each flow $F_i$ in memory portion 15I, in combination with counters $TS_k$ for each rate level k in memory portion 15K according to this embodiment of the invention is particularly advantageous, as these fields provide an efficient and accurate method of determining the measurement period during which the most recent RM cell $20_i$ for flow $F_i$ was processed. The use of individual counter $TS_k$ for each rate level k is particularly useful, considering that the measurement periods $T_k$ associated with the various rate levels k may expire at different times. Additionally, as will be discussed hereinbelow, this approach readily permits determination of whether an RM cell $20_i$ has already been received and processed during the current measurement period $T_k$ for the flow $F_i$, in which case the received RM cell $20_i$ will be ignored for purposes of updating the fields used in the bottleneck rate determination.

As is evident from the foregoing description of memory 15 according to this second preferred embodiment of the invention, individual rates need not be retained in memory 15, as the bottleneck rate may be readily calculated from the values stored in portions 15L, 15K, 15I, as will now be described relative to FIGS. 9 through 11. In this regard, FIG. 9 illustrates the operation of this second preferred embodiment of the invention in response to receipt of a forward-traveling RM cell $20_i$, while FIG. 11 illustrates the operation of this embodiment of the invention upon the expiration of a measurement period $T_k$. As noted above, this example will be described relative to a flow control method in which three levels k of nested measurement periods $T_k$ are used. Of course, prior to the control flow processing illustrated in FIGS. 9 through 11, the number of nested measurement intervals k are determined, as is the duration of minimum measurement period $T_0$, and the table of minimum cell rates $RI_k$ for each of levels k. These values are stored in the appropriate location of memory 15, control processor 14, or elsewhere in switch 8, as appropriate for the operations described hereinbelow.

In either case, prior to initiation of the operation of the processes of FIGS. 9 through 11, such as upon power-up, initialization is performed relative to the values stored in memory 15 or in registers of control processor 14, or elsewhere within switch 8, depending upon its architecture. In this example, each of the flow entries in portion 15I have their two-bit timestamp fields $TSV_i$ set to the value 3 (i.e., $11_2$), and have their level fields $ratelev_i$ set to the "unseen" value. In the level entries of portion 15K, each field $TS_k$, $N_k$, $R_k$, $SN_k$, $SR_k$ are initialized to zero, as are fields $r_1$, $m_1$ in portion 15L.

Referring now to FIG. 9, the operation of switch 8 upon receipt of a resource management (RM) cell $20_i$ for flow i will be described. Once RM cell $20_i$ is received, control processor 14 in switch 8 interrogates Current Cell Rate field $CCR_i$ of RM cell $20_i$, and determines which level k the corresponding flow $F_i$ is indicated by this rate. As noted above, this determination of process 38 may be performed by a look-up table or other comparison using the previously established values of minimum cell rates $RL_k$.

Decision 39 is then performed by control processor 14 to determine whether an RM cell $20_i$ for flow $F_i$ has already been "been" during the measurement period $T_k$ corresponding to level k from process 38. Referring now to FIG. 10a, the operation of control processor 14 in performing decision 39 will be described in detail. Decision 39 begins with process 50, where control processor 14 sets a variable $k^P$, representing the current level k as stored in field $ratelev_i$ of the entry in memory portion 15I that corresponds to flow $F_i$. Decision 51 is then performed to determine whether the current value of timestamp field $TSV_i$ for flow $F_i$ equals the current value of counter $TS_k$ for level $k=k^P$. If so (decision 51 is YES), the timestamp value $TSV_i$ for flow $F_i$ was set earlier in this same measurement period $T_k$, and as such an RM cell $20_i$ for flow $F_i$ must have already been "seen" by switch 8. Referring back to FIG. 9, the processing of current RM cell $20_i$ then ends, as all rates and counts have previously been updated for flow $F_i$ in this measurement period $T_k$. Referring back to FIG. 10a, if the timestamp value $TSV_i$ differs from the current value of counter $TS_k$ for level $k=k^P$ (decision 51 is NO), then the current instance of RM cell $20_i$ is the first received during measurement period $T_k$ for flow $F_i$. Control then passes to process 40 (in FIG. 9).

In process 40, control processor 14 updates count field $N_k$ and rate field $R_k$ of the entry in portion 15K of memory 15 corresponding to level k. As noted above, count field $N_k$ is simply a counter that stores the number of flows F having cell rates of level k, while rate field $R_k$ is an aggregation of the rates of these flows F (field $R_k$ is updated incrementally, simply by adding rate $CCR_i$ thereto). Additionally, process 40 determines whether rate $CCR_i$ is the highest rate yet received; if so, highest rate field $r_1$ is set (or maintained) at rate $CCR_i$, and count field $m_1$ is incremented or set to one, depending upon whether rate $CCR_i$ equals or is greater than the previous value of highest rate $r_1$. Of course, if rate $CCR_i$ is less than highest rate $r_1$, no updating of fields $r_1$, $m_1$ is necessary.

Following process 40, control processor 14 then determines whether the current level k associated with flow $F_1$ is the same as that determined from the previous instance of RM cell $20_i$. FIG. 10b illustrates, in detail, the operation of process 41 according to this preferred embodiment of the invention. In process 52, variable $k^P$ is set to equal the previous value stored in field $ratelev_i$ of the entry associated with flow $F_i$ in memory portion 15I. Decision 53 is then performed to compare the value of timestamp field $TSV_i$ with a decremented value of the corresponding counter $TS_k$ for the prior level $k^P$; these values should, of course, differ from one another, considering that decision 39 already determined that RM cell $20_i$ had not been previously seen (i.e., the timestamp value $TSV_i$ differed from the counter value $TS_k$ for the prior level $k^P$). The decrementing of the value of counter $TS_k$ for the prior level $k^P$ is performed in decision 53 to determine whether an instance of RM cell $20_i$ was processed in the most recent prior instance of measurement period $T_k$; if so, timestamp value $TSV_i$ would be set to the current value of counter $TS_k$ for the prior level $k^P$, less one, and decision 53 would return a YES, causing decision 41 to return a YES result as well.

Referring back to FIG. 9, upon decision 41 returning a YES, control passes to process 44, in which control processor 14 updates the entry of memory portion 15I. In this embodiment of the invention, level field $ratelev_i$ is set to the value k determined in process 38, and timestamp value $TSV_i$ is set to the current value stored in counter $TS_k$ for level k. The process is thus complete for this instance of RM cell $20_i$ for flow $F_i$.

However, referring back to FIG. 10b, if timestamp value $TSV_i$ differs from the current value of counter $TS_k$ for the prior level $k^P$, less one (decision 53 is NO), then the current level k necessarily differs from the previously saved level, and therefore the rate level k of flow $F_i$ has changed. This result causes decision 41 (FIG. 9) to return a NO, passing control to process 42. It should also be noted that if the current instance of RM cell $20_i$ is the first instance of an RM cell for flow $F_i$, decision 41 will also return a NO result (as $ratelev_i$="unseen" at this point in the process).

In process 42, control processor 42 updates the "saved" values of rates and counts for the level k to which flow $F_i$ has now changed. Specifically, saved count field $SN_k$ for level k is incremented by one to account for flow $F_i$, and saved rate field $SR_k$ is upwardly adjusted by the rate $CCR_i$ for flow $F_i$. As noted above, and as will be described in detail hereinbelow, these saved fields $SN_k$, $SR_k$ are used in the determination of bottleneck rate BR upon the expiration of shorter measurement periods than those corresponding to level k.

Decision 43 is then performed to determine whether RM cell $20_i$ is the first instance received for flow $F_i$; as noted above, decision 43 may be performed simply by interrogating field $ratelev_i$ to determine whether it equals the "unseen" value. If so (decision 43 is YES), process 44 is then performed for flow $F_i$, and the process ends for this instance of RM cell $20_i$. If not (decision 43 is NO), the level k of flow $F_1$ has in fact changed from the previous instance of RM cell $20_i$, and control passes to process 46 for adjustment of the saved values $SN_k$, $SR_k$ for the previous value of level k to which flow $F_i$ belonged.

In process 46, control processor 14 sets variable $k^P$ to the value of the prior level k to which flow $F_i$ belonged, by retrieving the value from field $ratelev_i$ from the entry in memory portion 15I associated with flow $F_i$. The count field $SN_{k^P}$ in the entry of memory portion 15K associated with prior level $k^P$ is also decremented in process 46, to account for flow $F_i$ no longer being of level $k^P$ but now instead associated with new level k (for which the count $SN_k$ was incremented in process 42). Following process 46, decision 47 is then performed to determine whether the old level $k^P$ is greater than the current level k; in other words, decision 47 determines the direction of change of the rate level k of flow $F_i$ (decision 41 having already determined that level k differs from prior level $k^P$).

If the current level k is less than the previous level $k^P$, which means that the current cell rate $CCR_i$ has increased at least into the next lower level $k^P-1$, decision 47 returns a YES, and control passes to process 48Y; conversely, if the current level k is greater than the previous level $k^P$, the current cell rate $CCR_i$ has decreased at least into the next higher level $k^P+1$, decision 47 returns a NO, and control passes to process 48N. Processes 48Y, 48N operate to reduce the value of saved rate field $SR_{k^P}$ by either the maximum or minimum limits of the range of cell rates associated with level $k^P$. In this embodiment of the invention, process 48Y subtracts minimum cell rate $RL_{k^P-1}$ of level $k^P-1$ from saved rate field $SR_{k^P}$, as minimum cell rate $RL_{k^P-1}$ corresponds to the maximum cell rate of level k. Conversely, process 48N subtracts minimum cell rate $RL_{k^P}$ from saved rate field $SR_{k^P}$. These estimated modifications of saved rate field $SR_{k^P}$ thus account for the loss of flow $R_i$ from level $k^P$, as process 42 has accounted for the presence of flow $F_i$ in saved rate field $SR_k$. In either case, control passes to process 44, where level field $ratelev_i$ and timestamp field $TSV_i$ in the entry of memory portion 15I associated with flow $F_i$ are updated to the current values of level k and counter value $TS_k$, as described above. The updating process is then complete for this instance of RM cell $20_i$.

The process of FIG. 9 according to this embodiment of the invention is, of course, repeated in response to receipt of each RM cell $20_i$ during any of the measurement periods $T_k$. In this manner, the present and saved fields that count the cell rates of the flows $F_i$, by rate level k, and the numbers of flows resident in each rate level k, are maintained, for use in the determination of the bottleneck rate BR upon expiration of a measurement period, as will now be described relative to FIG. 11.

The bottleneck rate calculation illustrated in FIG. 11 according to the preferred embodiment of the present invention begins upon the expiration of any measurement period $T_k$. As noted above, because of the nesting of measurement periods $T_k$ of multiple levels, the expiration of any measurement period $T_k$ of level k>0 will coincide with the expiration of lower level measurement periods $T_{k-1}$, $T_{k-2}$, ... $T_0$. According to this embodiment of the invention, process 54 begins by determining the level $k^*$ that is the highest level value k (i.e., the level associated with the lowest cell rates) for which a measurement period $T_k$ has expired in this most recent event.

Upon determining the highest expiring level $k^*$, control processor 14 then executes process 56 to derive total rate value $R_T$ for the flows $F_i$ then being handled by link L. As described above, this total rate value $R_T$ is an estimate, rather than an exact value, considering that measurement periods $T_k$ for any rate level k×$k^*$ will not have expired at this time (and as such, there is no guarantee that RM cells $20_i$ associated with these higher levels k will have yet been received). According to this embodiment of the invention, total rate value $R_T$ is determined from the following sum:

$$R_T = \sum_{k=0}^{k*} R_k + \sum_{k=1}^{k*} (SN_k - N_k)RL_k + \sum_{k>k*} SR_k \qquad (20)$$

The first term in equation (20) corresponds to the sum of the actual rate fields $R_k$ for those levels k associated with expiring measurement periods $T_k$ (in other words, for all levels k≤$k^*$), while the third term is the sum of the saved rate fields $SR_k$ for all levels k associated with measurement periods $T_k$ that have not yet expired (i.e., for all levels k>$k^*$). As described above relative to FIG. 9, however, some flows $F_i$ in the lower levels k≤$k^*$ may not have received their RM cells $20_i$ during the just-expired measurement periods $T_k$, presumably due to a change in their cell rates into the next higher k (lower cell rate) level. The second term in the sum of equation 920) thus estimates the rates for these flows $F_i$, for each rate level k from 1 to $k^*$, by subtracting the number $N_k$ of flows $F_i$ for which RM cells $20_i$ were in fact processed, from the saved number $SN_k$ of flows $F_i$ for that level (this difference corresponding to the number of flows that potentially changed levels), and assigning the minimum rate $RL_k$ for the corresponding level k to this number of flows. It is contemplated that this calculation will provide a relatively accurate estimate of the total ABR rate $R_T$ being consumed by ABR flows at the time of the expiration of one or more of the measurement periods $T_k$. Process 58 is then performed by control processor 14 to determine total flow count $N_T$, simply by summing the saved numbers $SN_k$ of flows for all levels k; as described above relative to FIG. 9, theses saved numbers $SN_k$ are each updated upon receipt of an RM cell $20_i$, even for flows $F_1$ that have changed levels.

Control then passes to process 60, in which control processor 14 determines the current bottleneck rate BR. According to this embodiment of the invention, bottleneck rate BR is defined in equation (19) as:

$$BR = \max\left(\frac{R}{N_T}, r_1 + \frac{R - R_T}{m_1}\right) \qquad (19)$$

Each of the values necessary for the determination of the bottleneck rate BR are present at this point either in memory 15 or in registers of control processor 14, depending upon the particular architecture of switch 8.

Following the determination of bottleneck rate BR in process 60, control processor 14 then resets certain fields in memory 15, in process 62. According to this embodiment of the invention, level-related entries of memory portion 15K for levels k≤$k^*$ store the values of their current rate and number fields $R_k$, $N_k$ into their saved rate and number fields $SR_k$, $SN_k$, and then zero their current rate and number fields $R_k$, $N_k$ in preparation for the next measurement period $T_k$. Additionally, the values of counters $TS_k$ for levels k≤$k^*$ are incremented, indicating the expiration of their associated measurement periods $T_k$. As the measurement periods $T_k$ for higher levels k are continuing, the entries in memory portion 15K for those levels are not modified in process 62.

In process 64, control processor 14 then identifies those flows $F_i$ that were previously of level k≤$k^*$, but for which no RM cell $20_i$ was received and processed in the just-expired measurement period $T_k$. This operation is performed, according to this embodiment of the invention, by examining the current value of rate level field ratelev$_i$ for each flow $F_i$ to determine if this value is less than or equal to $k^*$ and, if so, then determining whether its timestamp value $TSV_i$ is equal to the counter value $TS_k$ for its current rate level minus two. The subtraction of two from counter value $TS_k$ is performed in order to determine whether an RM cell $20_i$ was most recently processed during the measurement period $T_k$ preceding the just-expired measurement period $T_k$. If so, the corresponding flow $F_i$ may be assumed to have changed levels to the next higher value of k (i.e., the next slower rate level); for such flows $F_i$, process 64 then increments the value of its level field ratelev$_i$.

Following process 64, control processor 14 is now ready to begin requesting or inviting the various ATM traffic sources associated with flows $F_i$ traveling link L to change their current cell rates $CCR_i$ as appropriate for the new value of bottleneck rate BR. This operation is illustrated in process 66, by way of which control processor 14 either issues backward-traveling RM cells $20_i$ with the Explicit Rate (ER) field set to bottleneck rate BR. Alternatively, switch 8 may receive a backward-traveling RM cell $20_i$ for one of these flows $F_i$, in which case process 66 is performed by bounding the ER value to bottleneck rate BR (i.e., reducing the ER value to bottleneck rate BR if the current ER value exceeds BR, otherwise maintaining the same ER value therefor). In this manner, flow control according to this second preferred embodiment of the invention is effected. The process of FIG. 11 then ends, awaiting the next measurement period.

It has been observed, by way of simulation, that the flow control process according to this second embodiment of the invention is capable of enabling ABR-class ATM flows to attain their exact Max-Min fair rates in the steady state; this flow control is realized in such a manner as to be relatively responsive to changes in the ABR loading of links, while maintaining stable operation due to the filtering effects of the longer measurement intervals. The nested measurement periods permit the longer measurement intervals to control the number of flows and the total bandwidth occupied thereby, while the shorter measurement intervals can still responsively effect changes in the bottleneck rate. Additionally, this embodiment of the invention is also quite computationally efficient, as the computation time required for determining the bottleneck rate is independent of the number of flows being handled by the link; while resetting and initializing of the various fields requires computational time of on the order of the number of flows, these operations are relatively simple. Further, this second embodiment of the present invention may be readily adapted to realize flow control according to the MCR-plus-fair-share approach.

In each of the flow control approaches of the preferred embodiments of the invention, the bottleneck rate BR is effectively determined by allowing flows to increase their cell rates, or asking flows to decrease their cell rates, over a sequence of measurement periods. In each case, if the bottleneck rate BR for a link is greater than the Peak Cell Rate (PCR) of one or more flows communicated by the link, once the PCR for a flow is exceeded by the largest rate $r_1$, the flow is considered to be constrained by another link in the network (i.e., by the source, through its setting of the PCR). As a result, the PCR limits specified in the traffic contract for each flow are taken into consideration by the flow control method according to the preferred embodiment of the invention.

According to the preferred embodiments of the invention, therefore, efficient methods and ATM switches are provided by way of which flow control for the ABR service class of ATM communications may be effected. The computational cost of performing the flow control operation is much reduced, as only a single rate calculation at the expiration of each measurement period is performed. Furthermore, memory requirements in the switches are much reduced according to the preferred embodiments of the invention, as storage of individual cell rates for each of the flows handled by each of the links is to required, but instead only a sum of the rates, and identification of the highest rate, need be stored and incrementally updated upon the receipt of forward-traveling RM cells according to the present invention. It is therefore contemplated that the present invention will be quite beneficial when applied to ATM traffic management operations, such as carried out in ATM switches and other network elements.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of allocating data rates among a plurality of available bit rate message flows, at a communications link in a network, the link having an available bit rate bandwidth associated with available bit rate traffic, the method comprising the steps of:

responsive to receiving a resource management cell associated with one of the plurality of message flows, the resource management cell including a current cell rate value, performing the steps of:
assigning a rate level to the associated message flow, the rate level corresponding to a range of cell rates and to a corresponding one of a plurality of measurement periods of varying duration, wherein shorter duration measurement periods are associated with higher cell rates, and wherein expiration of each of the longer ones of the plurality of measurement periods coincides with the expiration of shorter ones of the plurality of measurement periods;
incrementing a current level count value for the assigned rate level;
adding the current cell rate value to a current level rate value for the assigned rate level;
responsive to the current cell rate value exceeding a maximum cell rate value, setting the maximum cell rate value to the current cell rate value and initializing a maximum cell rate count value; and
responsive to the current cell rate value equaling the maximum cell rate value, incrementing the maximum cell rate count value;
wherein each of a plurality of level memory entries is associated with one of the rate levels, and includes fields for storing the current level rate value and the current level count value, and also fields for storing a stored level rate value generated during a previous measurement period and a stored level count value also generated during a previous measurement period; and
responsive to one of the plurality of measurement periods expiring, performing the operations of:
generating a total link rate sum by adding a sum of the current level rate values for each rate level associated with an expiring measurement period with a sum of the stored level rate values for each rate level associated with a non-expiring measurement period;
generating a total link flow count of the sum of the stored level count values for each rate level;
determining a surplus bandwidth value for the link from the total link rate sum;
calculating a first bottleneck rate by adding the highest current cell rate value to the surplus bandwidth value;
generating a bottleneck rate corresponding to the larger of the first bottleneck rate and a ratio of the available bit rate bandwidth to the total link flow count; and
communicating backward-traveling resource management cells to sources of each of the plurality of available bit rate message flows, each of the backward-traveling resource management cells having an explicit rate value no higher than the bottleneck rate.

2. The method of claim 1, wherein the step of determining a surplus bandwidth value comprises:
subtracting the total link rate sum from an available bit rate bandwidth of the link; and
dividing the result of the subtracting step by the maximum cell rate count value.

3. The method of claim 1, further comprising:
after the step of generating the bottleneck rate, and for each of the rate levels associated with an expiring measurement period:
storing the current level count value as the stored level count value;
storing the current level rate value as the stored level rate value; and
resetting the current level count value and the current level rate value.

4. The method of claim 1, further comprising:
after the assigning step, determining whether a resource management cell associated with the same message flow has already been received during a current instance of the measurement period associated with the assigned rate level; and
then performing the incrementing and adding steps responsive to the determining step determining that a resource management cell associated with the same message flow has not already been received during a current instance of the measurement period associated with the assigned rate level.

5. The method of claim 4, wherein each of the plurality of level memory entries also includes a counter value;
wherein each of a plurality of flow memory entries is associated with one of the message flows, and includes a flow rate level field for storing a previous rate level for the flow, and a timestamp field, and;
wherein the determining step comprises:
comparing the timestamp field of the associated flow with the counter value of the level memory entry corresponding to the previous rate level;
and further comprising:
responsive to one of the plurality of measurement periods expiring, also incrementing the counter value of the level memory entry for each rate level associated with an expiring measurement period.

6. The method of claim 5, further comprising:
after the incrementing and adding steps, determining whether the assigned rate level equals the previous rate level; and
responsive to the determining step determining that the assigned rate level equals the previous rate level, storing the assigned rate level into the flow rate level field and storing the counter value of the level memory entry for the assigned rate level into the timestamp field.

7. The method of claim 6, further comprising:
responsive to the determining step determining that the assigned rate level does not equal the previous rate level, performing the steps of:
decrementing the value of the stored level rate count associated with the previous rate level; and
reducing the stored level rate value associated with the previous rate level.

8. The method of claim 7, wherein the reducing step comprises:
responsive to the assigned rate level corresponding to higher cell rates than the previous rate level, subtracting a minimum rate level of the range of cell rates corresponding to the next faster rate level than the previous rate level, from the stored level rate value; and
responsive to the assigned rate level corresponding to lower cell rates than the previous rate level, subtracting a minimum rate level of the range of cell rates corresponding to the previous rate level, from the stored level rate value.

9. A switch for routing cell-based communications received at one of a plurality of links, comprising:
a plurality of physical layer interfaces, each associated to and interfacing with one of the plurality of links;
a plurality of line interfaces, each coupled to one of the plurality of physical layer interfaces;
switch fabric, coupled to the plurality of line interfaces, for routing communications thereamong; and
a memory, for storing a plurality of level memory entries, each level memory entry associated with each of a plurality of rate levels, each of the plurality of rate levels corresponding to a range of cell rates and to a corresponding one of a plurality of measurement periods of varying duration, wherein longer duration measurement periods are associated with higher cell rates, and wherein expiration of each of the longer ones of the plurality of measurement periods coincides with the expiration of shorter ones of the plurality of measurement periods, each level memory entry including fields for storing the current level rate value and the current level count value, and also fields for storing a stored level rate value generated during a previous measurement period and a stored level count value also generated during a previous measurement period;
a control processor, coupled to the memory, for allocating data rates among a plurality of available bit rate message flows received over the plurality of links, wherein each of the plurality of links has an available bit rate bandwidth associated with available bit rate traffic, by performing a sequence of operations, for each link, comprising:
responsive to receiving a resource management cell associated with one of the plurality of message flows, the resource management cell including a current cell rate value, performing the operations of:
assigning a rate level to the associated message flow, based upon the current cell rate;
incrementing the current level count value for the assigned rate level;
adding the current cell rate value to the current level rate value for the assigned rate level;
responsive to the current cell rate value exceeding a maximum cell rate value, setting the maximum cell rate value to the current cell rate value and initializing a maximum cell rate count value; and
responsive to the current cell rate value equaling the maximum cell rate value, incrementing the maximum cell rate count value; and
responsive to one of the plurality of measurement periods expiring, performing the operations of:
generating a total link rate sum by adding a sum of the current level rate values for each rate level associated with an expiring measurement period with a sum of the stored level rate values for each rate level associated with a non-expiring measurement period;
generating a total link flow count of the sum of the stored level count values for each rate level;
determining a surplus bandwidth value for the link from the total link rate sum;
calculating a first bottleneck rate by adding the highest current cell rate value to the surplus bandwidth value;
generating a bottleneck rate corresponding to the larger of the first bottleneck rate and a ratio of the available bit rate bandwidth to the total link flow count; and
communicating backward-traveling resource management cells to sources of each of the plurality of available bit rate message flows, each of the backward-traveling resource management cells having an explicit rate value no higher than the bottleneck rate.

10. The switch of claim 9, wherein the operation of determining a surplus bandwidth value comprises:
subtracting the total link rate sum from an available bit rate bandwidth of the link; and
dividing the result of the subtracting operation by the maximum cell rate count value.

11. The switch of claim 9, wherein the control processor is further programmed to perform the operations of:
after the operation of generating the bottleneck rate, and for each of the rate levels associated with an expiring measurement period:
storing the current level count value as the stored level count value;
storing the current level rate value as the stored level rate value; and
resetting the current level count value and the current level rate value.

12. The switch of claim 9, wherein the control processor is further programmed to perform the operations of:
after the assigning operation, determining whether a resource management cell associated with the same message flow has already been received during a current instance of the measurement period associated with the assigned rate level; and
then performing the incrementing and adding operations responsive to the determining operation determining that a resource management cell associated with the same message flow has not already been received during a current instance of the measurement period associated with the assigned rate level.

13. The switch of claim 12, wherein each of the plurality of level memory entries also includes a counter value;

wherein the memory further comprises a plurality of flow memory entries, each associated with one of the message flows, and each including a flow rate level field for storing a previous rate level for the flow, and a timestamp field, and;

wherein the determining operation comprises:

comparing the timestamp field of the associated flow with the counter value of the level memory entry corresponding to the previous rate level;

and wherein the control processor is further programmed to perform the operation of:

responsive to one of the plurality of measurement periods expiring, also incrementing the counter value of the level memory entry for each rate level associated with an expiring measurement period.

14. The switch of claim 13, wherein the control processor is further programmed to perform the operations of:

after the incrementing and adding operations, determining whether the assigned rate level equals the previous rate level; and responsive to the determining operation determining that the assigned rate level equals the previous rate level, storing the assigned rate level into the flow rate level field and storing the counter value of the level memory entry for the assigned rate level into the timestamp field.

15. The switch of claim 14, wherein the control processor is further programmed to perform the operations of:

responsive to the determining operation determining that the assigned rate level does not equal the previous rate level, performing the operations of:

decrementing the value of the stored level rate count associated with the previous rate level; and reducing the stored level rate value associated with the previous rate level.

16. The switch of claim 15, wherein the reducing operation comprises:

responsive to the assigned rate level corresponding to higher cell rates than the previous rate level, subtracting a minimum rate level of the range of cell rates corresponding to the next faster rate level than the previous rate level, from the stored level rate value; and responsive to the assigned rate level corresponding to lower cell rates than the previous rate level, subtracting a minimum rate level of the range of cell rates corresponding to the previous rate level, from the stored level rate value.

* * * * *